(12) United States Patent
Hasegawa

(10) Patent No.: US 8,269,999 B2
(45) Date of Patent: Sep. 18, 2012

(54) INFORMATION PROCESSING APPARATUS, INFORMATION PROCESSING SYSTEM, AND METHOD OF CONTROLLING SUCH INFORMATION PROCESSING APPARATUS

(75) Inventor: Tomohisa Hasegawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 683 days.

(21) Appl. No.: 12/472,520

(22) Filed: May 27, 2009

(65) Prior Publication Data

US 2009/0296128 A1 Dec. 3, 2009

(30) Foreign Application Priority Data

May 30, 2008 (JP) ................................ 2008-143540

(51) Int. Cl.
*G06K 15/00* (2006.01)
*H04N 1/32* (2006.01)

(52) U.S. Cl. ...................... 358/1.14; 358/468

(58) Field of Classification Search ............. 348/231.5, 348/333.02, 333.12; 709/220; 358/1.15, 358/1.12, 468, 448, 1.14; 713/170, 175
See application file for complete search history.

(56) References Cited

U.S. PATENT DOCUMENTS

| | | | | |
|---|---|---|---|---|
| 5,771,289 A * | 6/1998 | Kuzma | ........................... | 713/153 |
| 7,636,040 B2 * | 12/2009 | Yoshida | ........................ | 340/525 |
| 7,710,467 B2 * | 5/2010 | Ikeda | ........................ | 348/231.5 |
| 2005/0174597 A1 * | 8/2005 | Ikeda | ........................... | 358/1.14 |
| 2006/0088160 A1 * | 4/2006 | Brown et al. | ................... | 380/51 |
| 2007/0185979 A1 * | 8/2007 | Yoshida | ........................ | 709/220 |
| 2007/0297014 A1 | 12/2007 | Kuga et al. | | |
| 2008/0034403 A1 | 2/2008 | Kakigi | | |
| 2008/0106560 A1 | 5/2008 | Shibusawa | | |
| 2009/0217161 A1 * | 8/2009 | Minegishi | ..................... | 715/274 |
| 2009/0231619 A1 * | 9/2009 | Takahashi | .................... | 358/1.15 |
| 2009/0243277 A1 * | 10/2009 | Liu | ................. | 283/71 |
| 2009/0262390 A1 * | 10/2009 | Tanaka | ........................ | 358/1.15 |
| 2009/0284786 A1 * | 11/2009 | Natori | ........................ | 358/1.15 |

FOREIGN PATENT DOCUMENTS

| | | |
|---|---|---|
| JP | 2007-299096 | 11/2007 |
| JP | 2008-003955 | 1/2008 |
| JP | 2008-040675 | 2/2008 |
| JP | 2008-123017 | 5/2008 |

* cited by examiner

*Primary Examiner* — Jerome Grant, II

(74) *Attorney, Agent, or Firm* — Fitzpatrick, Cella, Harper & Scinto

(57) ABSTRACT

The present invention can provide an efficient cancellation of a restriction on a stamp print process without the need for the user to request the manager for a temporary cancellation of the restriction on the stamp print process by phone or orally. The information processing apparatus makes a request for a temporary cancellation of the stamp print process specified in the first policy, and thereby acquires a second policy created outside based on the request. Then, the information processing apparatus temporarily cancels the stamp print process specified in the first policy, based on the second policy.

11 Claims, 30 Drawing Sheets

FIG. 7

CLIENT INFORMATION TABLE

| AGENT ID | DOMAIN NAME | COMPUTER NAME | USER NAME | IP ADDRESS | MONITOR POLICY ID |
|---|---|---|---|---|---|
| ABCDEFG | DomainA | ClientA | UserA | 192.168.0.1 | 1 |
| HIJKLMN | DomainB | ClientB | UserB | 192.168.0.2 | 2 |

FIG. 8

| | MONITOR POLICY SETTING | PC |
|---|---|---|
| BASIC INFORMATION | | |
| POLICY SET NAME | POLICY A ~901 | |
| COMMENT | COMMENT ON POLICY A ~902 | |

PRINT MONITOR SETTING   903   905   904   906

| | |
|---|---|
| DEFAULT | CONTROL, LOG: ☑ LOG  ☐ PRINT PROHIBITION<br>STAMP PRINTING: [STAMP PRINT 1 ▽] [ADDITION] [MODIFICATION] [DELETION]<br>PAGE SPECIFICATION: [ 0] [UP TO PAGE ▽] EXECUTE STAMP PRINTING |
| PRINT MONITORING (INDIVIDUAL SPECIFICATION) | 907  PRINTER NAME: [\\192.168.0.1\COMPANY C'S PRINTER 1]~909  908<br>PROCESS NAME: [notepad.exe] ~910<br>911  912<br>CONTROL, LOG: ☑ LOG  ☐ PRINT PROHIBITION<br>STAMP PRINTING: [EXECUTE STAMP PRINTING ▽]~913<br>PAGE SPECIFICATION: [ 0] [UP TO PAGE ▽] EXECUTE STAMP PRINTING<br>914  915 [ADDITION] [MODIFICATION] [DELETION] [UP] [DOWN]<br>916<br>LISTING: PRINTER [\\192.168.0.1\COMPANY C'S PRINTER 1]/PROCESS [notepad.exe]<br>PRINTER [\\192.168.0.1\COMPANY C'S PRINTER 2]<br>PRINTER [\\192.168.0.1\COMPANY C'S PRINTER 3]<br>PROCESS [editor.exe] |
| IGNORED DRIVER | DRIVER NAME: [                    ]~917<br>918~[ADDITION] [MODIFICATION] [DELETION]<br>LISTING: PDF DRIVER ~919 |
| | [RETURN TO LIST] [UPDATE]<br>920 |

FIG. 9

| | STAMP PRINT SETTING | PC |
|---|---|---|
| BASIC INFORMATION | | |
| STAMP PRINT SETTING NAME | STAMP PRINT 1 | ~1001 |
| COMMENT | COMMENT ON STAMP PRINT 1 | (OPTIONAL) ~1002 |
| STAMP PRINT SETTING | ~1003 | |

| | |
|---|---|
| HEADER DISPLAY INFORMATION | PRINTING METHOD:<br>○ WATERMARK PRINTING  ⊙ OVERPRINTING ~1004<br>DISPLAY INFORMATION TYPE:<br>[FIXED CHARACTER STRING ▽] ~1005<br>DISPLAY POSITION:<br>[CENTER ▽] ~1006<br>OPTIONAL CHARACTER STRING: ~1007<br>[                    ]<br>☐ BOLD  ☐ ITALIC  ☐ UNDERLINE ~1008<br>FONT: [MS GOTHIC ▽] ~1009<br>SIZE: [60] ~1010<br>COLOR: [BLACK ▽] ~1011<br>MARGIN: [75]  PIXEL ~1012 |
| FOOTER DISPLAY INFORMATION | PRINTING METHOD:<br>○ WATERMARK PRINTING  ⊙ OVERPRINTING<br>DISPLAY INFORMATION TYPE:<br>[OPTIONAL CHARACTER STRING ▽]<br>DISPLAY POSITION:<br>[CENTER ▽]<br>OPTIONAL CHARACTER STRING: ~1013<br>[THIS PRINTED MATTER IS OUTPUT BY [USER NAME]]<br>☐ BOLD  ☐ ITALIC  ☐ UNDERLINE<br>FONT: [MS GOTHIC ▽]<br>SIZE: [60]<br>COLOR: [BLACK ▽]<br>MARGIN: [10]  PIXEL |
| ENTIRE DISPLAY INFORMATION | PRINTING METHOD:<br>⊙ WATERMARK PRINTING  ○ OVERPRINTING<br>DISPLAY INFORMATION TYPE:<br>[OPTIONAL CHARACTER STRING ▽]<br>OPTIONAL CHARACTER STRING:<br>[CONFIDENTIAL INFORMATION]<br>☒ BOLD  ☐ ITALIC  ☐ UNDERLINE<br>FONT: [MS GOTHIC ▽]<br>SIZE: [240]<br>COLOR: [GRAY ▽]<br>CHARACTER ANGLE: [15]  DEGREE ~1014<br>DENSITY: [STANDARD ▽] ~1015 |

[RETURN TO LIST] [UPDATE] ~1016

FIG. 10

MONITOR POLICY TABLE ~1101

| MONITOR POLICY ID | MONITOR POLICY NAME | DESCRIPTION | UPDATE DATE | MONITOR POLICY |
|---|---|---|---|---|
| 1 | PolicyA | COMMENT ON POLICY A | 2008/01/01 00:00:00 | PRN_NAME.0=0,1,1,0,2,,<br>PRN_NAME.1=0,1,1,0,2,¥¥192.168.0.1¥ COMPANY C'S PRINTER 1, notepad.exe<br>PRN_NAME.2=0,1,1,0,2,¥¥192.168.0.1¥ COMPANY C'S PRINTER 2,<br>PRN_NAME.3=0,1,1,0,2,¥¥192.168.0.1¥ COMPANY C'S PRINTER 3,<br>PRN_NAME.4=0,1,1,0,2,,editor.exe,<br>PRN_Drv.0=PDF DRIVER 1 |
| 2 | PolicyB | COMMENT ON POLICY B | 2008/01/01 00:10:00 | PRN_NAME.0=1,1,1,0,2,,<br>PRN_NAME.1=0,1,1,0,2,¥¥192.168.0.1¥ COMPANY C'S PRINTER 1, notepad.exe,<br>PRN_Drv.0=PDF DRIVER 1 |

STAMP PRINT SETTING TABLE  1201

| STAMP PRINT SETTING ID | STAMP PRINT SETTING NAME | DESCRIPTION | UPDATE DATE | STAMP PRINT SETTINGS |
|---|---|---|---|---|
| 1 | STAMP PRINT 1 | COMMENT ON STAMP PRINT 1 | 2008/01/01 00:00:00 | PRN_STAMP_ID=1<br>PRN_STAMP_HEADTYPE=1<br>PRN_STAMP_HEADMODE=1<br>PRN_STAMP_HEADPOS=2<br>PRN_STAMP_HEADVALUE=<br>PRN_STAMP_HEADSTYLE=0<br>PRN_STAMP_HEADFONT=MS GOTHIC<br>PRN_STAMP_HEADSIZE=60<br>PRN_STAMP_HEADCOLOR=0<br>PRN_STAMP_HEADSPACESIZE=75<br>PRN_STAMP_FOOTTYPE=2<br>PRN_STAMP_FOOTMODE=1<br>PRN_STAMP_FOOTPOS=2<br>PRN_STAMP_FOOTVALUE=THIS PRINTED MATTER IS OUTPUT BY [USER NAME]<br>PRN_STAMP_FOOTSTYLE=0<br>PRN_STAMP_FOOTFONT=GOTHIC<br>PRN_STAMP_FOOTSIZE=60<br>PRN_STAMP_FOOTCOLOR=0<br>PRN_STAMP_FOOTSPACESIZE=10<br>PRN_STAMP_BODYTYPE=2<br>PRN_STAMP_BODYMODE=2<br>PRN_STAMP_BODYVALUE=PRECISION MEASURING EQUIPMENT<br>PRN_STAMP_BODYSTYLE=0<br>PRN_STAMP_BODYFONT=GOTHIC<br>PRN_STAMP_BODYSIZE=240<br>PRN_STAMP_BODYCOLOR=255<br>PRN_STAMP_BODYANGLE=15<br>PRN_STAMP_BODYDENSITY=2 |

FROM FIG. 11A

| 2 | STAMP PRINT 2 | COMMENT ON STAMP PRINT 1 | 2008/01/01 00:10:00 | PRN_STAMP_ID=2<br>PRN_STAMP_HEADTYPE=1<br>PRN_STAMP_HEADMODE=1<br>PRN_STAMP_HEADPOS=2<br>PRN_STAMP_HEADVALUE=<br>PRN_STAMP_HEADSTYLE=0<br>PRN_STAMP_HEADFONT=MS GOTHIC<br>PRN_STAMP_HEADSIZE=60<br>PRN_STAMP_HEADCOLOR=0<br>PRN_STAMP_HEADSPACESIZE=75<br>PRN_STAMP_FOOTTYPE=2<br>PRN_STAMP_FOOTMODE=1<br>PRN_STAMP_FOOTPOS=2<br>PRN_STAMP_FOOTVALUE=THIS PRINTED MATTER IS OUTPUT BY [USER NAME]<br>PRN_STAMP_FOOTSTYLE=0<br>PRN_STAMP_FOOTFONT=GOTHIC<br>PRN_STAMP_FOOTSIZE=60<br>PRN_STAMP_FOOTCOLOR=0<br>PRN_STAMP_FOOTSPACESIZE=10<br>PRN_STAMP_BODYTYPE=2<br>PRN_STAMP_BODYMODE=2<br>PRN_STAMP_BODYVALUE=CONFIDENTIAL INFORMATION<br>PRN_STAMP_BODYSTYLE=0<br>PRN_STAMP_BODYFONT=GOTHIC<br>PRN_STAMP_BODYSIZE=240<br>PRN_STAMP_BODYCOLOR=255<br>PRN_STAMP_BODYANGLE=15<br>PRN_STAMP_BODYDENSITY=2 |

FIG. 12

MONITOR POLICY FILE

```
[PCPOLICY]
PRN_NAME.0=0,1,1,0,2,,
PRN_NAME.1=0,1,1,0,2,¥¥192.168.0.1¥COMPANY C'S PRINTER 1, notepad.exe,
PRN_NAME.2=0,1,1,0,2,¥¥192.168.0.1¥COMPANY C'S PRINTER 2,
PRN_NAME.3=0,1,1,0,2,¥¥192.168.0.1¥COMPANY C'S PRINTER 3,
PRN_NAME.4=0,1,1,0,2,,editor.exe
PRN_Drv.0=PDF DRIVER 1
[STAMPRULE.1]
PRN_STAMP_ID=1
PRN_STAMP_HEADTYPE=1
PRN_STAMP_HEADMODE=1
PRN_STAMP_HEADPOS=2
PRN_STAMP_HEADVALUE=
PRN_STAMP_HEADSTYLE=0
PRN_STAMP_HEADFONT=MS GOTHIC
PRN_STAMP_HEADSIZE=60
PRN_STAMP_HEADCOLOR=0
PRN_STAMP_HEADSPACESIZE=75
PRN_STAMP_FOOTTYPE=2
PRN_STAMP_FOOTMODE=1
PRN_STAMP_FOOTPOS=2
PRN_STAMP_FOOTVALUE=THIS PRINTED MATTER IS OUTPUT BY [USER NAME]
PRN_STAMP_FOOTSTYLE=0
PRN_STAMP_FOOTFONT=GOTHIC
PRN_STAMP_FOOTSIZE=60
PRN_STAMP_FOOTCOLOR=0
PRN_STAMP_FOOTSPACESIZE=10
PRN_STAMP_BODYTYPE=2
PRN_STAMP_BODYMODE=2
PRN_STAMP_BODYVALUE=CONFIDENTIAL INFORMATION
PRN_STAMP_BODYSTYLE=0
PRN_STAMP_BODYFONT=GOTHIC
PRN_STAMP_BODYSIZE=240
PRN_STAMP_BODYCOLOR=255
PRN_STAMP_BODYANGLE=15
PRN_STAMP_BODYDENSITY=2
```

FIG. 14

OPERATION LOG TABLE

| OPERATION LOG ID | EVENT OCCURRENCE DATE | EVENT OCCURRENCE TIME | EVENT RECEIVING TIME | AGENT ID |
|---|---|---|---|---|
| 1 | 2008/01/01 | 10:00:00 | 2008/01/01 10:00:00 | ABCDEFG |
| 1 | 2008/01/01 | 11:00:00 | 2008/01/01 11:00:01 | HIJKLMN |

| COMPUTER NAME | DOMAIN NAME | ID ADDRESS | MAC ADDRESS | USER NAME |
|---|---|---|---|---|
| ClientA | DomainA | 192.168.1.1 | 00:00:00:00:00:01 | UserA |
| ClientB | DomainB | 192.168.1.2 | 00:00:00:00:00:02 | UserB |

| EVENT ID | DETAILED EVENT ID | DEVICE ID | PROCESS NAME | PRINT PAGE COUNT |
|---|---|---|---|---|
| 1 | 1 | 1 | procnameA | 1 |
| 5 | 1 | 1 | procnameB | 5 |

| PRINT TIME | PRINT EXECUTION PRINTER | PRINT EXECUTION PRINTER PORT | PRINT FILE NAME |
|---|---|---|---|
| 2008/01/01 09:59:59 | ￥￥192.168.0.1￥ COMPANY C'S PRINTER 1 | 9000 | GENERAL MATERIAL.doc |
| 2008/01/01 10:59:59 | ￥￥192.168.0.1￥ COMPANY C'S PRINTER 2 | 9000 | CONFIDENTIAL MATERIAL.doc |

| PRINT TYPE | STAMP PRINT CHARACTER (HEADER) | STAMP PRINT CHARACTER (FOOTER) | STAMP PRINT CHARACTER (BODY TEXT) |
|---|---|---|---|
| 1 | 2008/01/01 10:00:00,ClientA,DomainA, UserA,192.168.1.1.00:00:00:00:00:00 | THIS PRINTED MATTER IS OUTPUT BY [USER NAME A] | CONFIDENTIAL INFORMATION |
| 8 | NULL | NULL | NULL |

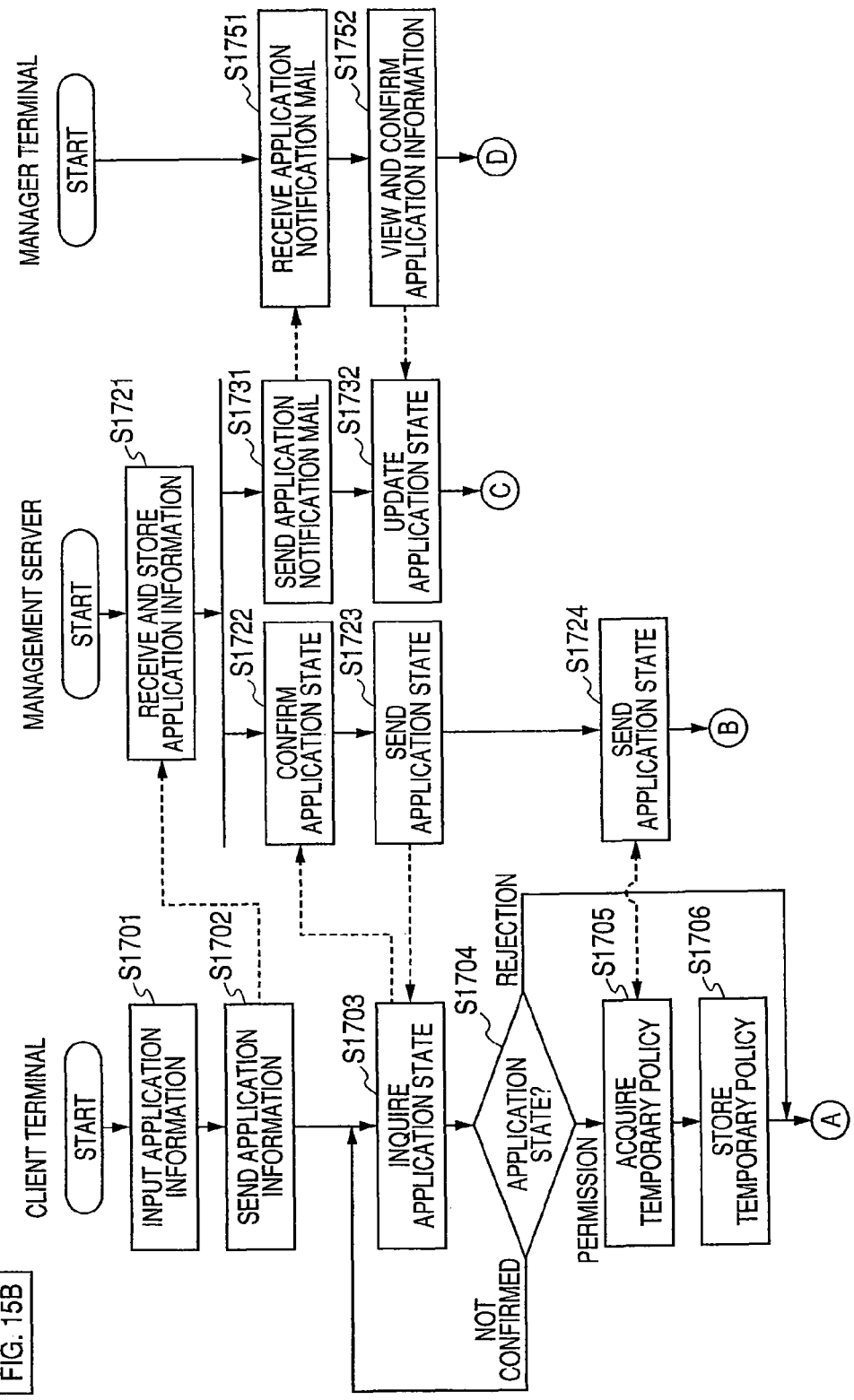

FIG. 17

TEMPORARY PERMISSION APPLICATION TABLE

| TEMPORARY PERMISSION APPLICATION ID | AGENT ID | APPLICATION STATE | APPLICATION USER NAME | APPLICANT NAME | APPLICATION COMPUTER NAME |
|---|---|---|---|---|---|
| 1 | ABCDEFG | 1 | UserA | TARO YAMADA | ClientA |
| 2 | HIJKLMN | 2 | UserB | JIRO SUZUKI | ClientB |

| APPLICATION DOMAIN NAME | APPLICATION REASON | APPLICATION TIME | CONFIRMATION TIME |
|---|---|---|---|
| DomainA | I SUBMIT MY APPLICATION FOR CANCELLATION OF THE STAMP PRINT FOR THE PURPOSE OF A NEED TO PRINT A MATERIAL FOR EXTERNAL USE. | 2006/12/12 00:00:00 | 2006/12/12 01:00:00 |
| DomainB | I SUBMIT MY APPLICATION FOR CANCELLATION OF THE STAMP PRINT FOR THE PURPOSE OF PRINTING A DESIGN DRAWING. | 2006/12/12 00:00:00 | NULL |

| CONFIRMATION NOTIFICATION ADDRESS | CONFIRMATION REASON | DETAIL SETTING |
|---|---|---|
| XXXXX@XXXXX.XXX | THE APPLICATION IS PERMITTED. | Expiredt=200612120015000<br>PrintCount=5<br>PageCount=5<br>TotalCount=100<br>AllowProc=notepad.exe,editor.exe<br>AllowPrint=¥¥192.168.0.1¥COMPANY C'S PRINTER 1<br>PrintSetting=15 |
| NULL | NULL | NULL |

FIG. 18

APPLICATION NOTIFICATION MAIL

SUBJECT: APPLICATION NOTIFICATION
BODY TEXT:
THE USER SUBMITS HIS/HER APPLICATION FOR TEMPORARY PERMISSION OF PRINT MONITORING.
THE APPLICATION IS AS FOLLOWS:

[APPLICATION TIME]     2006/12/12 00:00:00
[APPLICANT]            TARO YAMADA
[APPLICATION TERMINAL] ClientA
[APPLICATION REASON]   I SUBMIT MY APPLICATION FOR CANCELLATION OF THE STAMP PRINT
                       FOR THE PURPOSE OF A NEED TO PRINT A MATERIAL FOR EXTERNAL USE.

IN ORDER TO CONFIRM THE APPLICATION, PLEASE ACCESS THE MANAGEMENT WEB SERVER AND
EXECUTE THE CONFIRMATION PROCESS.

http://192.168.0.1/webserver/

FIG. 19

CONFIRMATION SCREEN

| CONFIRMATION SCREEN FOR TEMPORARY PERMISSION | PC |
|---|---|

| 2201 | APPLICATION CONTENT | |
|---|---|---|
| | APPLICATION TIME | 2006/12/12 00:00:00 |
| | STATE | NOT CONFIRMED |
| | COMPUTER NAME | ClientA |
| | DOMAIN NAME | DomainA |
| | USER NAME | UserA (TARO YAMADA) |
| | APPLICATION CONTENT | I SUBMIT MY APPLICATION FOR CANCELLATION OF THE STAMP PRINT FOR THE PURPOSE OF A NEED TO PRINT A MATERIAL FOR EXTERNAL USE. |

| | CONFIRMATION CONTENT | |
|---|---|---|
| 2202 | PERMISSION OR REJECTION FOR THE APPLICATION | ● PERMITTED  ○ REJECTED |
| 2203 | CONFIRMER | – |
| 2204 | VALID PERIOD | [50] [FOR MINUTES ▼] |
| 2205 | PRINT EXECUTION COUNT | [5] UP TO TIMES |
| 2206 | NUMBER OF PRINTABLE PAGES IN ONE PRINTING | [5] UP TO PAGES |
| 2207 | TOTAL NUMBER OF PRINTABLE PAGES | [100] UP TO PAGES |
| 2208 | PERMITTED PROCESS NAME | notepad.exe, editor.exe |
| 2209 | PERMITTED PRINTER NAME | ¥¥192.168.0.1¥ COMPANY C'S PRINTER 1 |
| 2210 | PERMITTED PRINT SETTING | ☑ MONOCHROME  ☑ COLOR  ☑ BOTH SIDES  ☑ SINGLE SIDE |
| 2211 | CONFIRMATION NOTIFICATION MAIL | ● SEND  ○ NOT SEND |
| 2212 | DESTINATION ADDRESS | |
| 2213 | REASON | |

| | RETURN TO LIST | EXECUTE CONFIRMATION PROCESS WITH ABOVE SETTINGS |
|---|---|---|

TEMPORARY POLICY TABLE

| AGENT ID | CREATION TIME | VALID PERIOD | APPLICATION USER NAME | APPLICATION COMPUTER NAME |
|---|---|---|---|---|
| ABCDEFG | 2006/12/12 01:00:00 | 2006/12/12 01:50:00 | UserA | ClientA |
| HIJKLMN | 2006/12/12 01:00:00 | 2006/12/12 01:00:00 | UserB | ClientB |

| APPLICATION DOMAIN NAME | TEMPORARY POLICY |
|---|---|
| DomainA | Expiredt=20061212015000<br>PrintCount=5<br>PageCount=5<br>TotalCount=100<br>AllowProc=notepad.exe,editor.exe<br>AllowPrint=¥¥192.168.0.1¥COMPANY C'S PRINTER 1<br>PrintSetting=15 |
| DomainB | Expiredt=20061212015000<br>PrintCount=5<br>PageCount=5<br>TotalCount=100<br>AllowProc=notepad.exe,editor.exe<br>AllowPrint=¥¥192.168.0.1¥COMPANY C'S PRINTER 1<br>PrintSetting=15 |

SUBJECT: CONFIRMATION NOTIFICATION FOR THE TEMPORARY PERMISSION APPLICATION
BODY TEXT:
THE MANAGER HAS PERMITTED YOUR APPLICATION FOR THE FOLLOWING TEMPORARY PERMISSION.
THE CONTENT IS AS FOLLOWS:

[APPLICATION TIME]　　　2006/12/12 00:00:00
[APPLICANT]　　　　　　　TARO YAMADA
[APPLICATION TERMINAL]　ClientA
[APPLICATION REASON]　　I SUBMIT MY APPLICATION FOR CANCELLATION OF THE STAMP PRINT
　　　　　　　　　　　　FOR THE PURPOSE OF A NEED TO PRINT A MATERIAL, FOR EXTERNAL USE.

[CONFIRMATION TIME]　　　2006/12/12 01:00:00
[CONFIRMATION CONTENT]　PERMITTED
[CONFIRMER]　　　　　　　JIRO YOSHIDA
[PERMISSION REASON]　　　YOUR APPLICATION HAS BEEN PERMITTED.
[RESTRICTION]　　　　　　VALID PERIOD: FROM 2006/12/12 01:00 TO 2006/12/12 01:50
　　　　　　　　　　　　PRINT EXECUTION COUNT: UP TO 5 TIMES
　　　　　　　　　　　　NUMBER OF PRINTABLE PAGES IN ONE PRINTING: UP TO 5 PAGES
　　　　　　　　　　　　TOTAL NUMBER OF PRINTABLE PAGES: UP TO 100 PAGES
　　　　　　　　　　　　PERMITTED PROCESS NAME: notepad.exe, editor.exe
　　　　　　　　　　　　PERMITTED PRINTER NAME: \\192.168.0.1\COMPANY C'S PRINTER
　　　　　　　　　　　　PERMITTED PRINT SETTING: MONOCHROME, COLOR, BOTH-SIDED, AND SINGLE-SIDED

FIG. 22

TEMPORARY POLICY FILE

| TEMPORARY POLICY FILE |
|---|
| AgentID=ABCDEFG<br>ComputerName=ClientA<br>DomainName=DomainA<br>UserName=UserA<br>Expiredt=200612120150000<br>PrintCount=5<br>PageCount=5<br>TotalCount=100<br>AllowProc=notepad.exe,editor.exe<br>AllowPrint=¥¥192.168.0.1¥COMPANY C'S PRINTER 1<br>PrintSetting=15 |

FIG. 26

SUBJECT: CONFIRMATION NOTIFICATION FOR THE TEMPORARY PERMISSION APPLICATION
BODY TEXT:
THE MANAGER HAS REJECTED YOUR APPLICATION FOR THE FOLLOWING TEMPORARY PERMISSION.
THE CONTENT IS AS FOLLOWS:

[APPLICATION TIME]         2006/12/12 00:00:00
[APPLICANT]                TARO YAMADA
[APPLICATION TERMINAL]     ClientA
[APPLICATION REASON]       I SUBMIT MY APPLICATION FOR CANCELLATION OF THE STAMP PRINT.

[CONFIRMATION TIME]        2006/12/12 01:00:00
[CONFIRMATION CONTENT]     REJECTED
[CONFIRMER]                JIRO YOSHIDA
[PERMISSION REASON]        YOUR APPLICATION HAS BEEN REJECTED SINCE THE REASON FOR STAMP PRINT CANCELLATION IS UNKNOWN.

FIG. 30

2008/01/01 00:00:00, USER 1, DOMAIN A, COMPUTER 1
, 192.168.0.1,00:00:00:00:00:00

FIG. 31

WATERMARK PRINTING

ABCDEFGHIJKLMNO
PQRSTUVWXYZABC
DEFGHIJKLMNOPQR

FIG. 32

OVERPRINTING PRINTING

ABCDEFGHIJKLMNO
STAMPSCHARAVTERYSTABC
DEFGHIJKLMNOPQR

INFORMATION PROCESSING APPARATUS, INFORMATION PROCESSING SYSTEM, AND METHOD OF CONTROLLING SUCH INFORMATION PROCESSING APPARATUS

BACKGROUND OF THE INVENTION

1. Field of the Invention

The present invention relates to a technique which allows for control of a print process based on a policy indicating a control content of a stamp print process.

2. Description of the Related Art

Recent leakage of personal information and confidential information may be caused partly by illegal accesses from outside, but mostly by careless actions of people inside a company. Further, paper on which confidential information is printed is taken outside and the confidential information may be leaked from the paper. With the recent awareness of personal information protection, companies are required to take measures against information leakage.

In view of the above points, Japanese Patent Application Laid-Open No. 2007-299096 discloses a system for preventing information leakage from a paper medium such that when a user enters a print instruction through a user terminal, a predetermined character string (date, IP address, and the like) is forcibly printed on the printed matter against the intention of the user who wants to print.

However, the system forcibly prints the predetermined character string on all the print data in response to the print instruction from the client terminal. Therefore, the character string is forcibly printed even on the print data such as a photograph, a design drawing, a material for external use, and the like, which should not have the character string printed thereon.

For this reason, according to the system, when a photograph, a design drawing, or a material for external use is to be printed, the manager needs to temporarily set the print control function to an invalid state. After the user executes the print, the manager needs to set the print control function to the original state.

Likewise, according to the system disclosed in the Japanese Patent Application Laid-Open No. 2007-299096, when printing is to be temporarily executed on a printer prohibiting the printing, the manager needs to temporarily set the print control function to an invalid state. After the user executes the print, the manager needs to set the print control function to the original state.

SUMMARY OF THE INVENTION

The present invention can provide an efficient cancellation of a restriction on a stamp print process without the need for the user to request the manager for a temporary cancellation of the restriction on the stamp print process by phone or orally.

According to the present invention, the information processing apparatus makes a request for requesting a temporary cancellation of the stamp print process specified in a first policy, and thereby acquires a second policy created outside based on the request. Then, the information processing apparatus temporarily cancels the stamp print process specified in the first policy, based on the second policy.

According to a first aspect of the present invention, an information processing apparatus for controlling a print process based on a first policy indicating a control content of a stamp print process includes: a sending unit configured to send, to a first external apparatus, request information for requesting a temporary cancellation of the stamp print process specified in the first policy; a first receiving unit configured to receive, from the first external apparatus, a second policy created by the first external apparatus in response to the request information; and a control unit configured to control the print process by temporarily cancelling the stamp print process specified in the first policy, based on the second policy.

According to a second aspect of the present invention, in an information processing system including an information processing apparatus adapted to control a print process based on a first policy indicating a control content of a stamp print process and a management apparatus adapted to create the first policy, the information processing apparatus being connected to the management apparatus via a network, the information processing apparatus including: a first sending unit configured to send, to the management apparatus, request information for requesting a temporary cancellation of the stamp print process specified in the first policy; the management apparatus comprising: a first receiving unit configured to receive the request information from the information processing apparatus; a creation unit configured to create a second policy based on the request information; and a second sending unit configured to send the second policy to the information processing apparatus, wherein the information processing apparatus further includes: a second receiving unit configured to receive the second policy from the management apparatus; and a control unit configured to control the print process by temporarily cancelling the stamp print process specified in the first policy, based on the second policy.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a drawing schematically illustrating an example of a database table containing information handled in step S611 in FIG. 6.

FIG. 8 is a drawing illustrating an example of a screen displayed in step S631 in FIG. 6.

FIG. 9 is a drawing illustrating an example of a screen displayed in step S631 in FIG. 6.

FIG. 10 is a drawing schematically illustrating an example of a database table containing information handled in step S610 in FIG. 6.

FIG. 11 is comprised of FIGS. 11A and 11B schematically illustrating an example of a database table containing information handled in step S610 in FIG. 6.

FIG. 12 is a drawing schematically illustrating an example of a monitor policy file saved in step S603 in FIG. 6.

FIG. 14 is a drawing schematically illustrating an example of a database table containing information handled in step S620 in FIG. 6.

FIG. 17 is a drawing schematically illustrating an example of a database table containing information handled in step S1721 in FIGS. 15A and 15B.

FIG. 18 is a drawing illustrating an example of email sent in step S1931 in FIGS. 15A and 15B.

FIG. 19 is a drawing illustrating an example of a screen displayed in step S1752 in FIGS. 15A and 15B.

FIG. 20 is a drawing schematically illustrating an example of a database table containing information handled in step S1732 in FIGS. 15A and 15B.

FIG. 21 is a drawing illustrating an example of email sent in step S1735 in FIGS. 15A and 15B.

FIG. 22 is a drawing schematically illustrating an example of a temporary policy file saved in step S1706 in FIGS. 15A and 15B.

FIG. 26 is a drawing illustrating an example of email sent in step S1736 in FIGS. 15A and 15B.

FIG. 30 is an example of a default stamp character string determined in step S4101 in FIG. 29.

FIG. 31 is a drawing illustrating an example of watermark printing.

FIG. 32 is a drawing illustrating an example of overprinting.

DESCRIPTION OF THE EMBODIMENTS

Preferred embodiments of the present invention will now be described in detail in accordance with the accompanying drawings.

Hereinafter, exemplary embodiments to which the present invention is applied will be described in detail with reference to the accompanying drawings.

Figure 1:
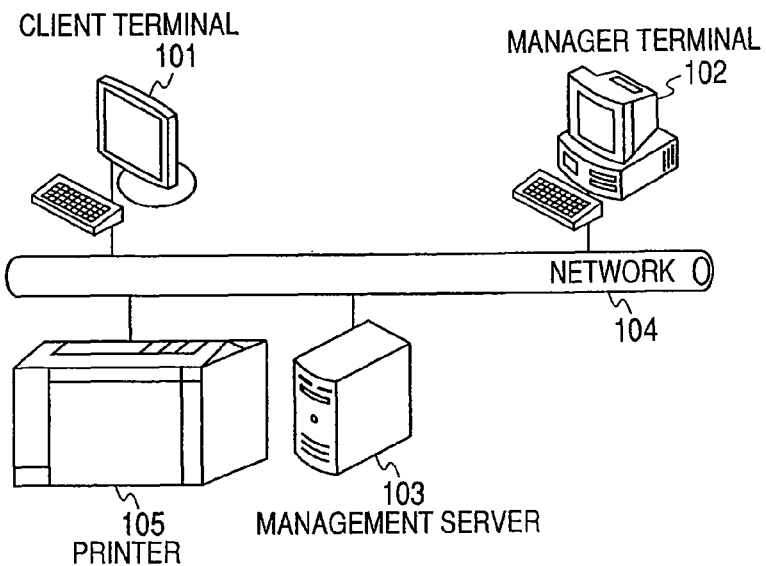
FIG. 1 is a block diagram schematically illustrating a system configuration of an information processing system according to an embodiment of the present invention.

FIG. 1 is a block diagram schematically illustrating a configuration of an information processing system according to an embodiment of the present invention. As shown in FIG. 1, the information processing system according to the present embodiment is configured such that a client terminal 101, a manager terminal 102, a management server 103 and a printer 105 are communicably connected to each other via a network 104 such as a LAN or the like. Note that the client terminal 101 is an application example of the information processing apparatus according to the present invention. The management server 103 is an application example of a management apparatus, which is a first external apparatus according to the present invention. The manager terminal 102 is an application example of a second external apparatus according to the present invention. Further, the configuration of the client terminal 101 and the management server 103 is an application example of the information processing system according to the present invention.

The client terminal 101, the manager terminal 102 and the management server 103 include the information processing apparatus such as a computer.

The client terminal 101 is a terminal used by a user. An agent program is installed in the client terminal 101 and has a function of controlling printing by a monitor policy distributed by the management server 103 and a function of sending an operation log to the management server 103. The monitor policy is an application example of a first policy according to the present invention.

The manager terminal 102 is a terminal used by a manager. The manager terminal 102 is connected to the management server 103 through a WEB browser installed in the manager terminal 102. The manager terminal 102 has a function of operating and viewing the system settings and states.

The management server 103 has system information such as client information and a monitor policy. The management server 103 has a function of providing a system setting screen to the manager terminal 102, a function of receiving an operation log from the client terminal 101, and a function of distributing a monitor policy to the client terminal 101.

The printer 105 can communicate with the client terminal 101 via the network 104, and can print (output) in response to a print instruction from the client terminal 101.

Note that FIG. 1 illustrates an example of configuring one client terminal 101, one manager terminal 102, one management server 103 and one printer 105, but a plurality of terminals, servers and printers may be used.

Figure 2:
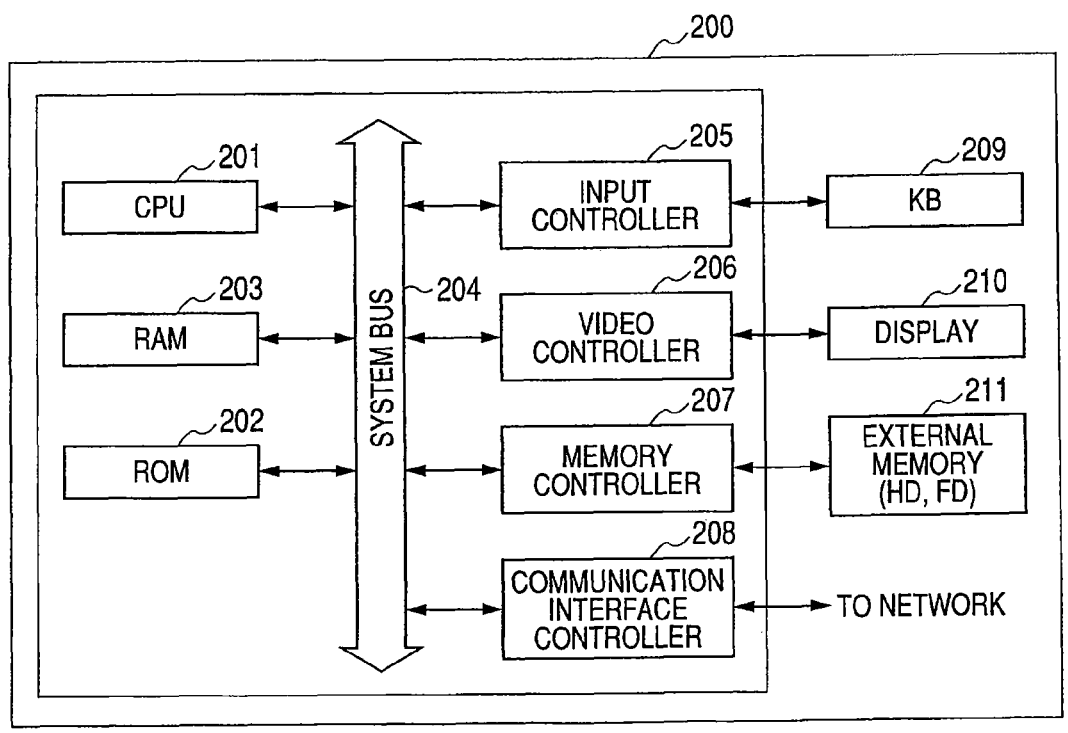
FIG. 2 is a block diagram schematically illustrating a hardware configuration of an information processing apparatus in FIG. 1.

FIG. 2 is a block diagram schematically illustrating a hardware configuration of the information processing apparatus such as the client terminal 101, the manager terminal 102 and the management server 103 in FIG. 1.

In FIG. 2, a CPU 201 controls individual devices and controllers connected to a system bus 204 in an integrated manner.

A ROM 202 or an external memory 211 contains a BIOS (Basic Input/Output System) and an operating system (hereinafter referred to as OS) which are control programs of the CPU 201, as well as various programs described later necessary for achieving the functions executed by the server or the individual client terminals.

A RAM 203 functions as a main memory, a work area and the like for the CPU 201. The CPU 201 performs various operations by loading a program necessary for execution into the RAM 203 and executing the program.

An input controller (input C) 205 controls an input from a pointing device such as a key board 209 and a mouse (not shown).

A video controller (VC) 206 controls a display on a display 210. The display 210 may be a CRT display or a liquid crystal display.

A memory controller (MC) 207 controls an access to the external memory 211 such as a hard disk (HD) and a floppy disk (registered trademark) (FD) containing a boot program, browser software, various applications, font data, a user file, an edit file, and various kinds of data; or a compact flash memory connected to a PCMCIA card slot via an adapter, and the like.

The communication interface controller (communication I/F C) 208 is connected to and communicates with an external device via the network 104. The communication interface controller 208 executes a communication control process on the network, such as an Internet communication using TCP/IP.

The CPU 201 enables a display on the display 210, for example, by executing a process of loading (rasterizing) an outline font into a display information area in the RAM 203. The CPU 201 also enables a user instruction to be input on the display 210 using a mouse cursor (not shown) or the like.

The programs for implementing the present embodiment are stored in the external memory 211. The CPU 201 load a program from the external memory 211 to the RAM 203 as needed for execution thereof.

The external memory 211 contains various kinds of data and tables used by the program according to the present embodiment, which are detailed later. Note that the external memory 211 of the management server 103 contains a database described later.

Figure 3:
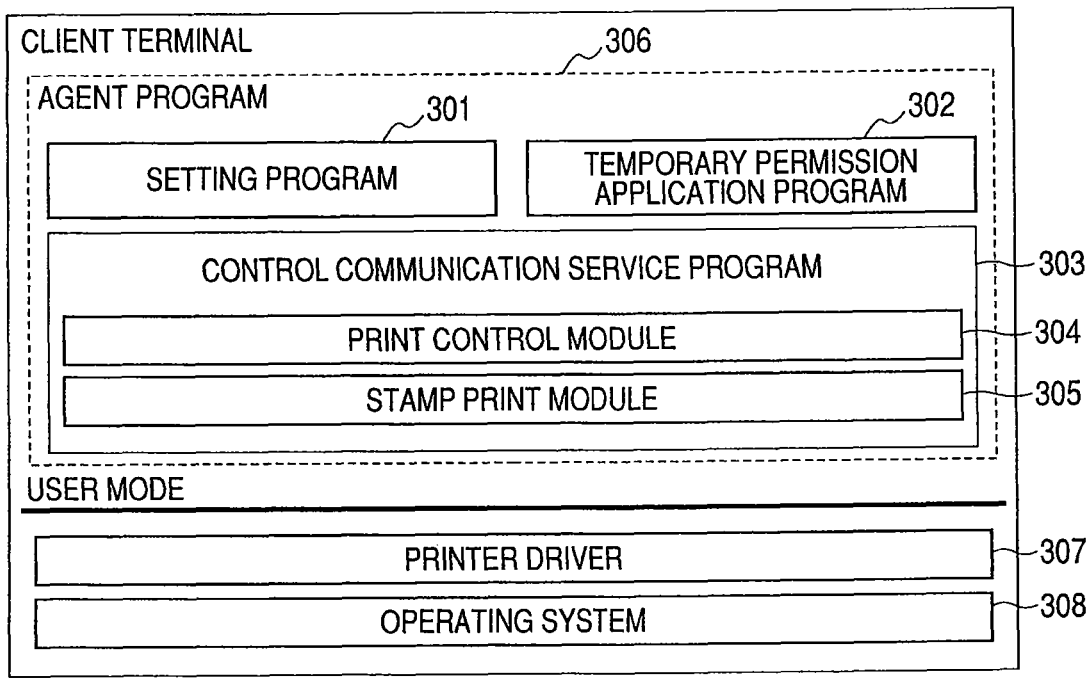
FIG. 3 is a module block diagram schematically illustrating a configuration of the modules installed in the information processing apparatus (client terminal) in FIG. 1.

FIG. 3 is a block diagram schematically illustrating a configuration of the modules installed in the client terminal 101 illustrated in FIG. 1.

First, the client terminal 101 includes an operating system 308, and an agent program 306 and a printer driver 307 operating on the operating system 308.

The agent program 306 includes a setting program 301, a temporary permission application program 302 and a control communication service program 303.

The control communication service program 303 includes a print control module 304 and a stamp print module 305.

The agent program 306, the printer driver 307 and the operating system 308 are stored in the external memory 211 illustrated in FIG. 2.

First, the setting program 301 provides a user operation screen such as a screen for terminating the agent program.

Second, the temporary permission application program 302 provides a function of executing the temporary permission application of the print control function.

The control communication service program 303 operates as a resident program and provides a function of acquiring a monitor policy from the management server 103 and a function of sending an operation log thereto.

Next, the print control module 304 is called from within the control communication service program 303 and provides a function of performing a print control using an API hook.

The API hook refers to a process of performing an interrupt when an arbitrary program calls a specific API. The print control module 304 uses the API hook to interrupt the called API so as to acquire information handled by the API or prohibit the execution of the API.

The print control module 304 uses the API hook to perform print control. More specifically, the print control module 304 monitors the print-related API (StartPage function, etc.) executed by the operating system 308. When the print-related API is called by a program, the print control module 304 interrupts the API to acquire the print information (the name of the printer performing the printing) handled by the API or prohibit the printing.

Next, the stamp print module 305 is called from within the control communication service program 303 and provides a function of controlling the stamp print.

The printer driver 307 provides a function for the operating system 308 to control the printer 309.

Figure 4:
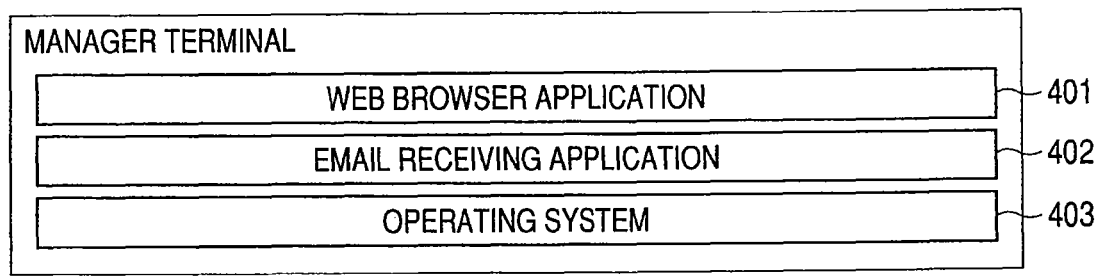
FIG. 4 is a module block diagram schematically illustrating a configuration of the modules installed in the information processing apparatus (manager terminal) in FIG. 1.

FIG. 4 is a block diagram schematically illustrating a configuration of the modules installed in the manager terminal 102 in FIG. 1.

The manager terminal 102 includes an operating system 403, and a WEB browser application 401 and an email receiving application 402 operating on the operating system 403. The operating system 403, the WEB browser application 401 and the email receiving application 402 are stored in the external memory 211 illustrated in FIG. 2.

The manager can use the WEB browser application 401 to connect to the management server 103 to set and view the system information. The email receiving application 402 provides a function of receiving email from the management server 103.

Figure 5:
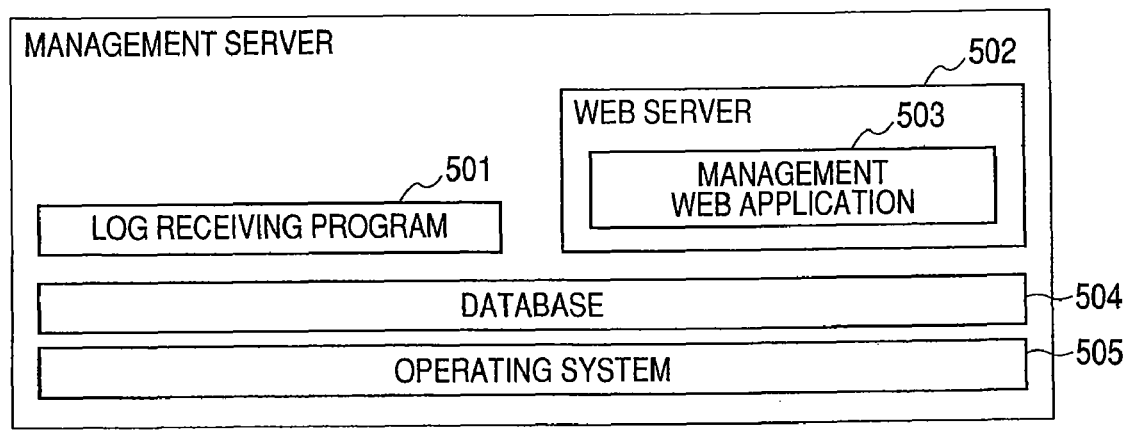
FIG. 5 is a module block diagram schematically illustrating a configuration of the modules installed in the information processing apparatus (management server) in FIG. 1.

FIG. 5 is a block diagram schematically illustrating a configuration of the modules installed in the management server 103 in FIG. 1.

The management server 103 includes an operating system 505, and a log receiving program 501, a WEB server 502, a management WEB application 503 and a database 504 which are programs operating on the operating system 505. The operating system 505, the log receiving program 501, the WEB server 502, the management WEB application 503 and the database 504 are stored in the external memory 211 illustrated in FIG. 2.

The log receiving program 501 provides a function of receiving an operation log from the client terminal 101 and storing the operation log in the database.

The management WEB application 503 operates on a WEB server 502. The management WEB application 503 provides a function of sending a setting screen, system information and operation log information to the WEB browser application 401 in response to a request from the WEB browser application 401 installed in the manager terminal 102. Further, the management WEB application 503 provides a function of distributing a monitor policy to the client terminal 101 in response to a monitor policy acquisition request from the client terminal 101.

Next, the database 504 stores the system information received from the manager terminal 102 and the operation log received from the client terminal 101.

Note that the log receiving program 501, the management WEB application 503, the database 504 and the operating system 505 are stored in the external memory 211 illustrated in FIG. 2.

Figure 6:
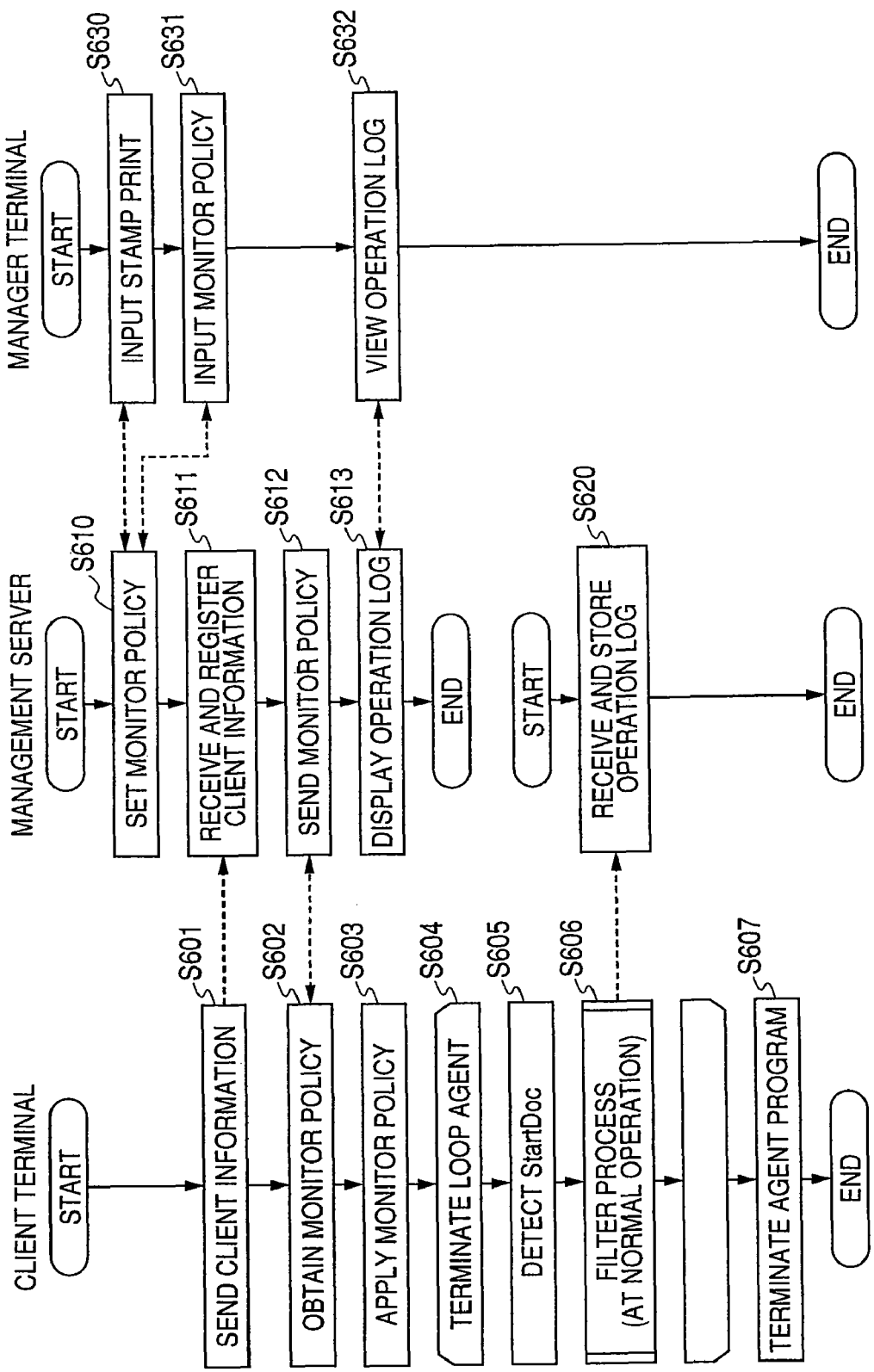
FIG. 6 is a flowchart illustrating an example of a processing procedure of print control according to an embodiment of the present invention.

FIG. 6 is a flowchart illustrating an example of a processing procedure of the print control according to the present embodiment.

Note that the processes in steps S601 and S607 illustrated in FIG. 6 are implemented when the CPU 201 of the client terminal 101 loads and executes the setting program 301 stored in a storage unit such as the external memory 211.

Further, the processes in steps S602 and S603 illustrated in FIG. 6 are implemented when the CPU 201 of the client terminal 101 loads and executes the control communication service program 303 stored in a storage unit such as the external memory 211.

Further, the processes in steps S604 and S606 illustrated in FIG. 6 are implemented when the CPU 201 of the client terminal 101 loads and executes the print control module 304 stored in a storage unit such as the external memory 211.

Further, the processes in steps S610 to S613 illustrated in FIG. 6 are implemented when the CPU 201 of the management server 103 loads and executes the management WEB application 503 stored in a storage unit such as the external memory 211.

Further, the process in step S620 illustrated in FIG. 6 is implemented when the CPU 201 of the management server 103 loads and executes the log receiving program 501 stored in a storage unit such as the external memory 211.

Finally, the processes in steps S630 to S632 illustrated in FIG. 6 are implemented when the CPU 201 of the manager terminal 102 loads and executes the WEB browser application 401 stored in a storage unit such as the external memory 211.

Next, the individual steps in the flowchart illustrated in FIG. 6 are described. First, the process of inputting the stamp print settings executed in steps S610 and S630 is described. Here, the process of inputting the stamp print settings refers to a process of inputting a setting as to what character string is forcibly printed on the printed matter specified for printing by the client terminal 101.

First, in step S630, when an activation instruction from the manager is detected, the CPU 201 of the manager terminal 102 activates the WEB browser application 401. Then, the WEB browser application 401 connects to the management WEB application 503 of the management server 103.

Then, the WEB browser application 401 acquires information for displaying a monitor policy setting screen (FIG. 8) for receiving a setting of the monitor policy from the management WEB application 503 and displays the monitor policy setting screen. The monitor policy setting screen allows an input of a print control setting as to whether or not to prohibit the printing, from the client terminal 101. The detail will be described in the monitor policy creation process (steps S610 and S631). Note that FIG. 8 illustrates an example of a screen displayed in step S631 in FIG. 6.

Next, when the WEB browser application 401 recognizes that the manager presses an addition button 906 on the monitor policy setting screen (FIG. 8), the WEB browser application 401 acquires, from the management server 103, the information for displaying a screen (hereinafter referred to as a stamp print setting screen) for setting what stamp (hereinafter referred to as a stamp character string) is forcibly printed on the print data specified for printing by the client terminal 101. Then, the WEB browser application 401 uses the acquired information to display the stamp print setting screen (FIG. 9). The stamp print setting screen is a screen for receiving, from the manager, the setting as to what stamp is printed. Note that FIG. 9 illustrates an example of a screen displayed in step S630 in FIG. 6. Further, the stamp character string is an application example of the stamp information according to the present invention.

Here, the individual settable items on the stamp print setting screen are described. Hereinafter, the information set on the stamp print setting screen is referred to as stamp print setting information.

Note that the watermark printing 1003 on the stamp print setting screen (FIG. 9) refers to a printing method of printing a stamp character string under the original printed data (ABC . . . ) as illustrated in FIG. 31.

Note that the overprinting 1004 on the stamp print setting screen (FIG. 9) refers to a printing method of printing a stamp character string on the original printed data (ABC . . . ) as illustrated in FIG. 32.

The other setting items on the stamp print setting screen are as follows. A stamp print setting name 1001 allows an entry of a name of the stamp print setting. A comment 1002 allows an entry of a description of the stamp print setting. A display information type 1005 allows an entry of a setting as to whether to print a predetermined character string or an optional character string on the printed matter. The display position 1006 allows an entry of a setting as to in what position in the printed matter the character is displayed. An optional character string 1007 allows an entry of a character string to be printed on the printed matter. A bold, italic, underline 1008 allows an entry of a setting of style (bold, italic and underline) of the character string to be printed on the printed matter. A font 1009 allows an entry of a setting of a font of the character string to be printed on the printed matter. A size 1010 allows an entry of a setting of a size of the character string to be printed on the printed matter. A color 1011 allows an entry of a setting of a color of the character string to be printed on the printed matter. A margin 1012 allows an entry of a setting of a position of the character string to be printed on the printed matter. A character angle 1014 allows an entry of a setting of an angle of the character string to be printed on the entire printed matter. A density 1015 allows an entry of a setting of a density of the character string to be printed on the entire printed matter.

Next, when the manager inputs the stamp print setting on the stamp print setting screen (FIG. 9) and presses the update button 1016, the WEB browser application 401 sends the input stamp print setting information (hereinafter referred to as the stamp print setting information) to the management WEB application 503 of the management server 103. The above described process in step S630 has now been completed.

Next, when the stamp print setting information is received from the manager terminal 102, the management WEB application 503 of the management server 103 stores the stamp print setting information in the stamp print setting table (FIGS. 11A and 11B) of the database. FIGS. 11A and 11B are drawings schematically illustrating an example of a database table containing information handled in step S610 in FIG. 6.

The stamp print setting table (FIGS. 11A and 11B) contains a stamp print setting ID for identifying the stamp print setting information, a stamp print setting name, a description of the stamp print setting, an update date of the stamp print setting, and individual stamp print setting information input on the stamp print setting screen. Hereinafter, the settings stored in the stamp print setting 1201 will be described.

The stamp print settings in the stamp print setting 1201 include a stamp print setting ID for identifying the stamp print setting information, a method of printing a header, a type of a character string to be printed in the header, a setting of a position of the character string to be printed in the header, a character string to be printed in the header, a setting of a style of the character string to be printed in the header, a setting of a font of the character string to be printed in the header, a setting of a size of the character string to be printed in the header, a setting of a color of the character string to be printed in the header, a setting of a margin size of the character string to be printed in the header, a method of printing a footer, a type of a character string to be printed in the footer, a setting of a position of the character string to be printed in the footer, a setting of the character string to be printed in the footer, a setting of a style of the character string to be printed in the footer, a setting of a font of the character string to be printed in the footer, a setting of a size of the character string to be printed in the footer, a setting of a color of the character string to be printed in the footer, a setting of a margin size of the character string to be printed in the footer, an entire printing method, a type of the entire character string to be printed, a setting of the entire character string to be printed, a setting of a style of the entire character string to be printed, a setting of a font of the entire character string to be printed, a setting of a size of the entire character string to be printed, a setting of a color of the entire character string to be printed, an angle of the entire character string to be printed, a density of the entire character string to be printed and the like.

Regarding the above described header printing method, numeral "1" denotes "watermark printing", and numeral "2" denotes "overprinting". Regarding the type of a character string to be printed in the header, numeral "1" denotes "default character string" and numeral "2" denotes "optional character string". Regarding the setting of a position of the character string to be printed in the header, numeral "1" denotes "left-adjusted", numeral "2" denotes "center", and numeral "3" denotes "right-adjusted". Regarding the setting of a style of the character string to be printed in the header, numeral "0x00000001" denotes "bold", numeral 0x00000002 denotes "italic", numeral 0x00000004 denotes "underline". Regarding the footer printing method, numeral "1" denotes "watermark printing", and numeral "2" denotes "overprinting". Regarding the type of a character string to be printed in the footer, numeral "1" denotes "default character string", and numeral "2" denotes "optional character string". Regarding the setting of a position of the character string to be printed in the footer, numeral "1" denotes "left-adjusted", numeral "2" denotes "center", and numeral "3" denotes "right-adjusted". Regarding the entire printing method, numeral "1" denotes "watermark printing", and numeral "2" denotes "overprinting". Regarding the type of the entire character string to be printed, numeral "1" denotes "default character string", and numeral "2" denotes "optional character string". Regarding the setting of a style of the entire character string to be printed, numeral "0x00000001" denotes "bold", numeral 0x00000002 denotes "italic", numeral 0x00000004 denotes "underline". Regarding the density of the entire character string to be printed, numeral "1" denotes "low", numeral "2" denotes "standard", and numeral "3" denotes "high".

The above described stamp print setting in step S610 has now been completed. Note that a plurality of pieces of stamp print setting information may be created. A list of stamp print setting names, which are the names of stamp print setting information settings, are displayed in the list boxes 905 and 913 on the monitor policy setting screen (FIG. 8) described later, and the stamp print setting information set by the manager is selected.

Next, the process of creating a monitor policy in steps S610 and S631 will be described. The monitor policy creating process is a process of creating a monitor policy to be distributed to the client terminal 101. The created monitor policy is distributed to the client terminal 101 in step S612 of sending the monitor policy. Then, the print control module 304 of the client terminal 101 performs printing control based on the received monitor policy.

A plurality of pieces of monitor policies may be created and be distributed for each client terminal or for each user logging in the client terminal.

First, when an activation instruction from the manager is detected, the CPU 201 of the manager terminal 102 activates the WEB browser application 401. Then, the WEB browser application 401 connects to the management WEB application 503 of the management server 103. Then, the WEB browser application 401 acquires information for displaying a monitor policy setting screen (FIG. 8) for receiving a setting of the monitor policy from the management WEB application 503 and displays the monitor policy setting screen based on the information. The monitor policy setting screen allows an input of a print control-related setting as to whether or not to prohibit the printing executed by the client terminal 101.

The monitor policy setting screen (FIG. 8) is a screen for inputting a print control setting, and allows an entry of a setting of printing control such as a monitor policy set name 901, a comment 902, and print-related settings 903 to 919. More specifically, the monitor policy set name 901 allows an entry of a setting of the name of a monitor policy. The comment 902 allows an entry of the description of the monitor policy. The log 903 allows an entry of a setting as to whether or not to acquire the operation log at default setting. The print prohibition 904 allows an entry of a setting as to whether to allow or prohibit the print execution at default setting. The stamp print 905 allows an entry of a setting as to whether or not to execute the stamp print at default setting. The addition, modification, deletion 906 allows an entry of a setting of addition, modification, and deletion of a stamp print setting. The page specifications 907 and 908 allow an entry of a setting about the page number to which the stamp print should be executed or about the page interval at which the stamp print should be executed. The printer name 909 allows an entry of the name of a printer to be individually monitored. The process name 910 allows an entry of the name of a process to be individually monitored. The log 911 allows an entry of a setting as to whether or not to acquire the operation log at individual monitoring. The print prohibition 912 allows an entry of a setting as to whether to allow or prohibit the print execution at individual monitoring. The stamp print 913 allows an entry of a setting as to whether or not to execute the stamp print at individual monitoring. The page specification 914 allows an entry of a setting about the page number to which the stamp print should be executed or the page intervals at which the stamp print should be executed. The addition, modification, deletion 915 allows an entry of a setting of addition, modification, and deletion of an individual monitoring setting. The listing 916 displays a list of individual monitoring settings. The driver name 917 allows an entry of the name of a driver to be excluded from the application of the monitor policy. The addition, modification, deletion 918 allows a specification of addition, modification, deletion of a driver to be excluded from the application of the monitor policy. The listing 919 displays a list of driver names to be excluded from the application of the monitor policy.

Here, the settings which can be input on the monitor policy setting screen will be described. Note that a list of stamp print setting names of the stamp print settings created in the stamp print input process (step S630) is displayed in the stamp print list boxes 905 and 913 on the monitor policy setting screen. The user can select a stamp print setting to be printed on the printed matter from the stamp print list boxes 905 and 913.

Further, a list of character strings "up to page" and "page intervals" is displayed in the page specification list box 908 on the monitor policy setting screen.

When "up to page" is selected in the page specification list box 908, the stamp print is executed up to the page specified in the page specification text box Conversely, when "page intervals" is selected in the page specification list box 908, the stamp print is executed at the page intervals input in the page specification text box 907. The page specification 914 on the monitor policy setting screen is handled in the same manner as the above list boxes.

Next, when the manager inputs a monitor policy on the monitor policy setting screen (FIG. 8) through screen operation, and presses the update button 920, the WEB browser application 401 sends the information input on the monitor policy setting screen to the management WEB application 503 (step S631).

Then, the management WEB application 503 of the management server 103 stores the received information in the monitor policy table (FIG. 10) of the database 504 (step S610). Note that FIG. 10 is a drawing schematically illustrating an example of a database table containing information handled in step S610 in FIG. 6.

The monitor policy table contains the monitor policy ID for identifying the monitor policy, the monitor policy name, the description of the monitor policy, the update date of the monitor policy, and the monitor policy 1101, which is a setting content input in step S631.

Here, the values stored in the monitor policy 1101 of the monitor policy table are described in detail. First, a value indicating the content of the default monitor policy is stored in the monitor policy expressed in the property name PRN_NAME.0. The values are stored in a comma-delimited format (""). The first column contains a value indicating a print prohibition setting: 0 indicates print permission; and 1 indicates print rejection. The second column contains a value indicating an operation log acquisition setting: 0 indicates that the operation log acquisition is not performed; and 1 indicates that the operation log acquisition is performed. The third column contains the value of the stamp print setting ID. If the stamp print setting ID is not used, 0 is stored. The fourth column contains a value of the page specification. The fifth column contains the type of the page specification. If the value (N) specified in the fourth column is 1, the printing is executed at (N) page intervals; and if the value (N) specified in the fourth column is 2, the printing is executed up to the specified page. The sixth column contains a printer name. The seventh column contains a process name. For example, in the case of "PRN_NAME.0=0,1,1,0,2,¥¥192.168.0.1¥ company C's printer 1,notepad.exe" for the monitor policy ID=1, and the monitor policy name=Policy A, the first column contains 0, indicating print permission. The second column contains 1, indicating that the operation log is acquired. The third column contains 1, indicating that stamp print setting ID=1 is set. The fourth column contains 0, indicating that the page 0 is set. The fifth column contains 2, indicating that the printing is performed up to page 0 specified in the fourth column. The sixth column contains ¥¥192.168.0.1¥ company C's printer 1, indicating that the printer name is ¥¥192.168.0.1¥ company C's printer 1. The seventh column contains notepad.exe, indicating that the process name is notepad.exe.

Next, an individual monitor policy expressed in the property name PRN_NAME.N (N=1,2,3, . . . ) contains a value indicating the content of the individual monitor policy. The meaning of the individual value stored in the first to seventh columns of the monitor policy expressed in the property name PRN_NAME.N (N=1,2,3, . . . ) is the same as that of the individual value stored in the first to seventh columns of the monitor policy expressed in the above described property name PRN_NAME.0.

Next, the monitor policy expressed in the property name PRN_Drv.N (N=0,1,2,3, . . . ) contains ignored driver information. For example, the PRN_Drv.0=PDF driver 1 indicates that the driver specified by PDF driver 1 is ignored. The above described monitor policy creation process has now been completed.

Next, the client information registration process related to steps S601 and S611 will be described. The client information registration process is a process of registering the client information of the client terminal 101 to be monitored, in the management server 103. This process allows the management server 103 to identify the client terminal 101 to be monitored and to distribute the monitor policy thereto.

First, when the manager installs the agent program 306 in the client terminal 101 through screen operation, the client terminal 101 activates the setting program 301. Then, the setting program 301 acquires the client information from the external memory 211 and sends the client information to the management WEB application 503 of the management server 103 (step S601). Here, the client information refers to one or more pieces of information of the IP address, the user name, the computer name, the domain name, and the request type. At this time, a number indicating the client information registration process is stored in the request type of the client information.

Next, management WEB application 503 of the management server 103 receives the client information from the client terminal 101 and stores the client information in the client information table (FIG. 7) of the database 504 (step S611). FIG. 7 is a drawing schematically illustrating an example of a database table containing information handled in step S611 in FIG. 6.

As shown in FIG. 7, the client information table contains not only the client information but also the agent ID for identifying the client terminal 101 and the default monitor policy ID created in the monitor policy creation process (steps S610 and S631). The above client information refers to the domain name, the computer name, the user name, and the IP address of the corresponding client terminal.

Here, the agent ID and the monitor policy ID refers to information assigned by numbering when the management server 103 receives client information from the client terminal 101. The management server 103 associates the numbered agent ID and the monitor policy ID with the acquired client information and stores the associated information in the client information table (step S611). The above described client information registration process has now been completed.

Next, the monitor policy distribution and application process in steps S602, S603 and S612 will be described. The monitor policy distribution and application process is a process of distributing the monitor policy created in the monitor policy creation process (steps S610 and S631) to the client terminal 101. Then, the monitor policy is distributed and applied to the client terminal 101, and the agent program 306 starts the print execution monitoring process.

First, the control communication service program 303 of the client terminal 101 sends the client information to the management WEB application 503 of the management server 103. At this time, a number indicating the monitor policy request is stored in the request type of the client information (step S602). Note that the process in which the client terminal 101 receives the monitor policy in step S602 is an example process of a second receiving unit of the information processing apparatus according to the present invention.

Next, when the client information is received from the client terminal 101, the management WEB application 503 of the management server 103 acquires the monitor policy ID matching the client information from the client information table (FIG. 7). More specifically, the domain name, the computer name, the user name and the IP address, which are the pieces of client information received (acquired) from the client terminal, are compared with the domain name, the computer name, the user name and the IP address stored in the client information table (FIG. 7) respectively, and the monitor policy ID in the matched line is acquired. Then, the management WEB application 503 refers to the monitor policy table and acquires the monitor policy 1101 corresponding to the acquired monitor policy ID from the monitor policy table.

Further, the management WEB application 503 uses the stamp print setting ID written in the third column of the acquired monitor policy to acquire the stamp print setting applied to the monitor policy from the stamp print setting table. Then, the management WEB application 503 sends the monitor policy 1101 and the stamp print setting 1201 to the control communication service program 303 of the client terminal 101 (step S612).

Next, the control communication service program 303 of the client terminal 101 receives the monitor policy 1101 and the stamp print setting 1201, and stores the monitor policy file (FIG. 12) in the storage unit such as the external memory 211. FIG. 12 is a drawing schematically illustrating an example of the monitor policy file stored in step S603 in FIG. 6.

Further, when the monitor policy file is created, the control communication service program 303 of the client terminal 101 reads the monitor policy file and stores the settings thereof in the RAM 203 of the client terminal 101 (step S603). The above described monitor policy distribution and application process has now been completed.

Then, the monitor policy created in the monitor policy creation process (steps S610 and S631) is stored in the client terminal 101, and the agent program 306 performs print control based on the monitor policy setting.

Hereinafter, the filter process in steps S604 to S607 will be described. The filter process is a process of detecting a print executed by the client terminal 101 and controlling the print based on the distributed monitor policy.

First, when an arbitrary program stored in the external memory 211 of the client terminal 101 executes a print (StartDoc function), the print control module 304 of the client terminal 101 detects (hook process) the print (StartDoc function) (step S605).

Figure 13:
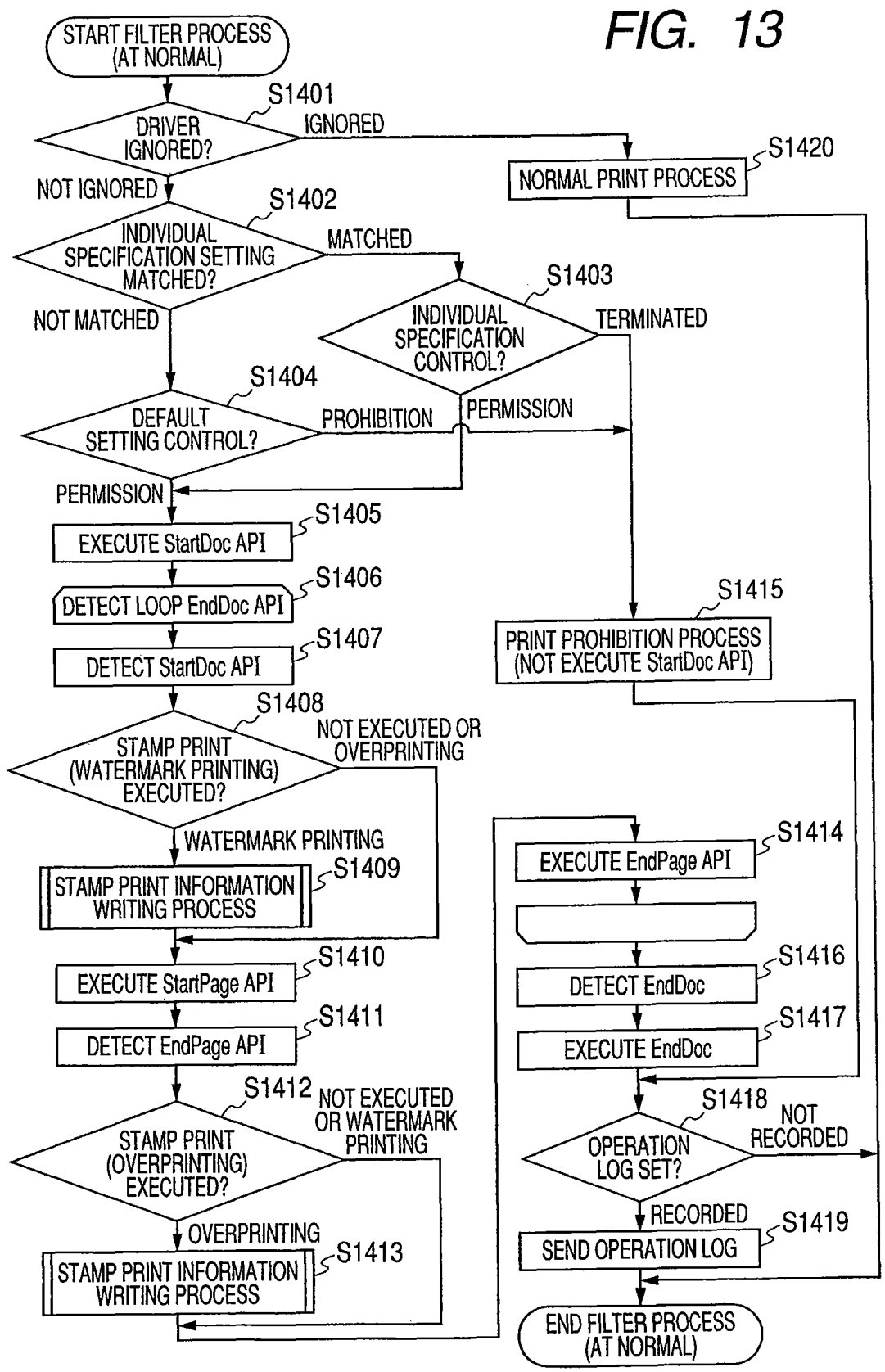
FIG. 13 is a flowchart of a filter process executed in step S605 in FIG. 6.

Next, the print control module 304 of the client terminal 101 executes the filter process illustrated in FIG. 13 and executes the print control based on the monitor policy (step S606). FIG. 13 is a flowchart of the filter process executed in step S605 in FIG. 6.

Hereinafter, the process in the flowchart will be described with reference to the flowchart in FIG. 13. Note that the filter process is implemented when the CPU 201 of the client terminal 101 loads and executes the print control module 304 and the stamp print module 305 stored in the storage unit such as the external memory 211.

First, the print control module 304 compares the ignored driver name (value of the PRN_Drv.N in the monitor policy) stored in the RAM 203 in the process in step S603 with the driver name used for the detected print (step S1401).

If the driver name is not matched with the ignored driver name of the monitor policy, the print control module 304 executes the normal print process and completes the process (step S1420). Conversely, if the driver name is matched with the ignored driver name, the process proceeds to step S1402.

Next, the print control module 304 compares the process name and the printer name defined in the individual specification (PRN_NAME.N) of the monitor policy stored in the RAM 203 with the process name and the printer name used to execute the detected print (step S1402).

If the process name or the printer name is matched with the process name or the printer name defined in the individual specification, the print control module 304 determines whether the print control defined in the matched individual specification is permission or prohibition (step S1403). More specifically, a determination is made as to whether the value of the first column of the policy of the matched individual specification (PRN_NAME.N) is 0 or 1.

If the print control is permission, the process proceeds to step S1405. Conversely, if the print control is prohibition, the process proceeds to step S1415. The print control module 304 returns an error to the arbitrary program executing the print without executing the StartDoc function. Then, the process proceeds to step S1418 (step S1415). This process terminates the print process.

Conversely, in the determination process in S1402, if the process name or the printer name is not matched with the process name or the printer name defined in the individual specification, the process proceeds to step S1404. The print control module 304 determines the print control defined in the default print setting (PRN_NAME.0) of the monitor policy stored in the RAM 203 (step S1404). More specifically, a determination is made as to whether the value of the first column of the policy of the default print setting (PRN_NAME.0) is 0 or 1.

If the print control is prohibition, the print control module 304 executes the above described process in step S1415. If the print control is permission, the process proceeds to the next process in which the print control module 304 executes the StartDoc function (step S1405). The process starts printing.

Next, the arbitrary program executing the printing executes the StartPage function, the print control module 304 detects (hook process) that the StartPage function is executed (step S1407).

Figure 27:
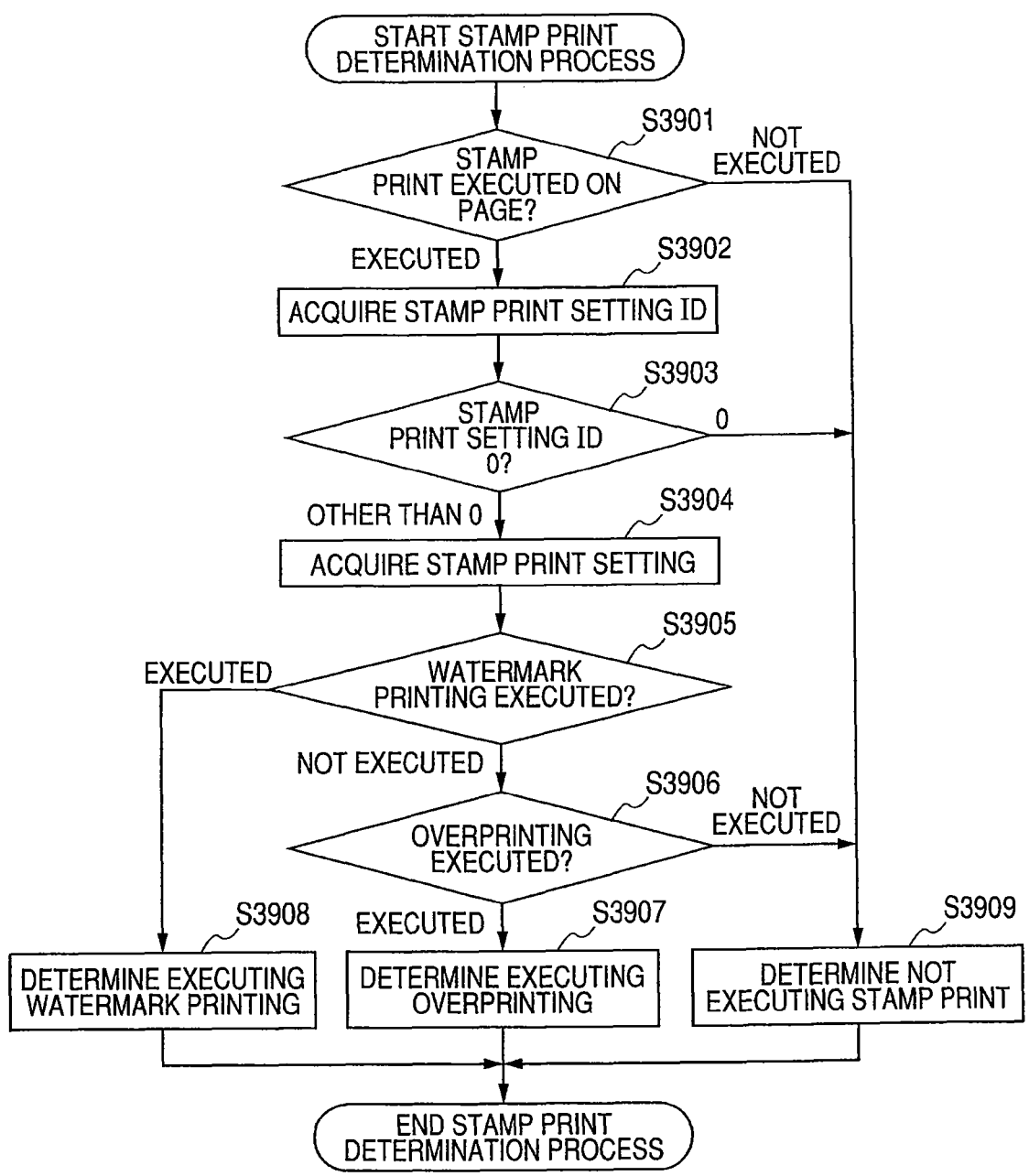
FIG. 27 is a flowchart of a stamp print determination process executed in step S1408 in FIG. 13.

Then, the print control module 304 refers to the stamp print setting of the monitor policy matched in the determination process in step S1402 or S1404 and determines whether or not to execute the watermark printing (step S1408). More specifically, the print control module 304 executes the stamp print determination process in FIG. 27. FIG. 27 is a flowchart of the stamp print determination process executed in step S1408 in FIG. 13.

Hereinafter, the stamp print determination process will be described with reference to FIG. 27. Note that the stamp print determination process illustrated in FIG. 27 is implemented when the CPU 201 of the client terminal 101 loads and executes the print control module 304 stored in the storage unit such as the external memory 211.

First, the print control module 304 of the client terminal 101 determines whether or not to execute the stamp print on the page (step S3901). More specifically, a determination is made as to whether the value (fourth column) of the page specification of the monitor policy matched in the determination process in step S1402 or S1404 is 0 or not. If the value is 0, the print control module 304 determines that stamp print should be executed on all the pages. If the value is not 0, the print control module 304 determines whether the type (fifth column) of the page specification of the monitor policy is N page intervals or up to N page. Then, the print control module 304 determines whether or not the page is a page on which the stamp print should be executed.

Next, the print control module 304 acquires the stamp print setting ID (third column) of the monitor policy matched in the determination process in step S1402 or S1404 from the monitor policy stored in the RAM 203 (step S3902).

Next, the print control module 304 determines whether the value of the acquired stamp print setting ID is 0 (stamp print is not executed) or not (step S3903). If the value of the stamp print setting ID is 0, the print control module 304 determines that the stamp print is not executed (step S3909). If the value of the stamp print setting ID is not 0, the process proceeds to step S3904.

Next, the print control module 304 of the client terminal 101 uses the monitor policy stored in the RAM 203 to find the stamp print setting matched with the acquired stamp print setting ID (step S3904). If the matched stamp print setting ID is found, the print control module 304 determines whether or not the watermark printing is set in the values (PRN_STAMP_HEADTYPE, PRN_STAMP_FOOTERTYPE, PRN_STAMP_BODYTYPE) of the individual print method of the matched stamp print settings (step S3905). If the watermark printing is set, the print control module 304 determines that the watermark printing is executed (step S3908).

Further, if the watermark printing is not set, the print control module 304 determines whether or not the overprinting is set in the values (PRN_STAMP_HEADTYPE, PRN_STAMP_FOOTERTYPE, PRN_STAMP_BODYTYPE) of the individual print method of the matched stamp print settings (step S3906). If the overprinting is set, the print control module 304 determines that the overprinting is executed (step S3907). If the overprinting is not set, the print control module 304 determines that the overprinting is not executed (step S3909).

The above described stamp print determination process has now been completed.

Then, if a determination is made in step S1408 that watermark printing is not executed, the process proceeds to step S1410. Conversely, if a determination is made that watermark printing is executed, the stamp print module 305 executes the stamp character string writing process (step S1409).

Figure 28:
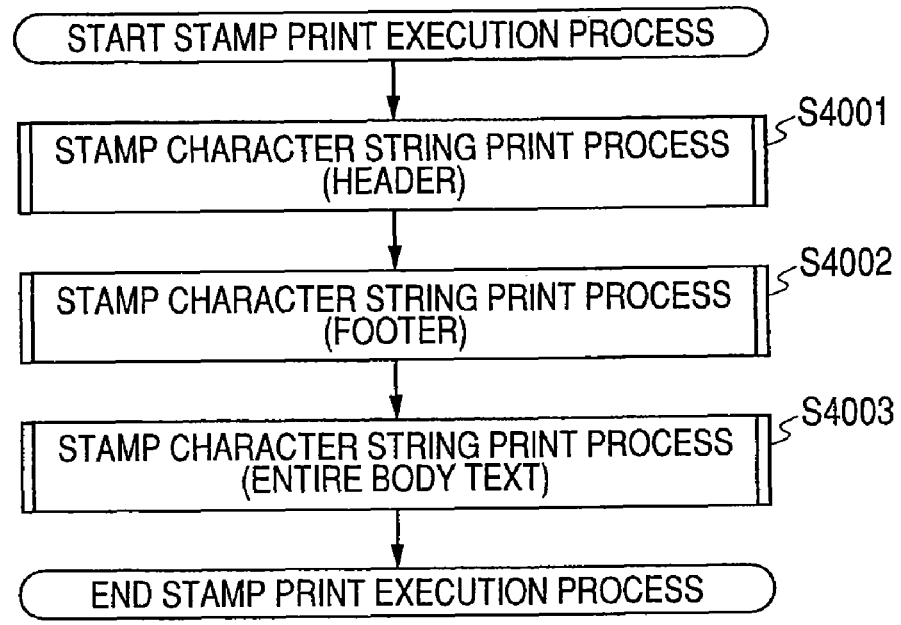
FIG. 28 is a flowchart of a stamp print execution process executed in step S1409 in FIG. 13.

Hereinafter, the stamp character string writing process will be described with reference to the flowchart illustrated in FIG. 28. Note that the stamp character string writing process illustrated in FIG. 28 is implemented when the CPU 201 of the client terminal 101 loads and executes the stamp print module 305 stored in the storage unit such as the external memory 211.

Figure 29:
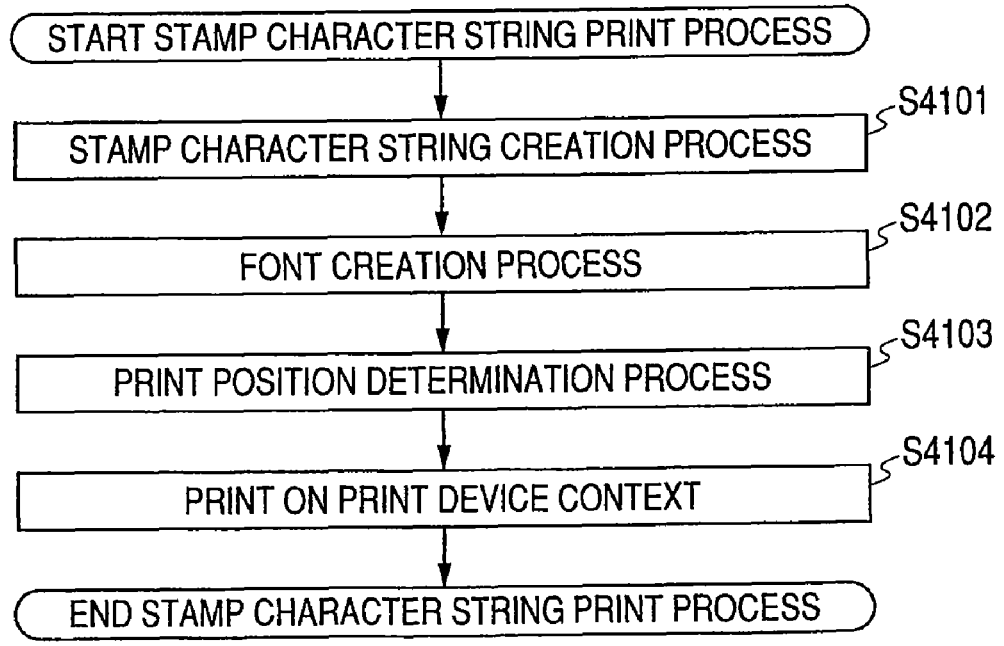
FIG. 29 is a flowchart of a stamp character string print process executed in steps S4001, S4002 and S4003 in FIG. 28.

First, the stamp print module 305 of the client terminal 101 executes the stamp character string print process in the header of the printed matter (step S4001). More specifically, the process in the flowchart illustrated in FIG. 29 is executed. FIG. 29 is a flowchart of the stamp character string print process executed in steps S4001, S4002 and S4003 in FIG. 28.

Hereinafter, the stamp character string print process will be described with reference to FIG. 29. Note that the stamp character string print process illustrated in FIG. 29 is implemented when the CPU 201 of the client terminal 101 loads and executes the stamp print module 305 stored in the storage unit such as the external memory 211.

First, the stamp print module 305 of the client terminal 101 executes the stamp character string creation process (step S4101). More specifically, the stamp print module 305 acquires the type (PRN_STAMP_HEADMODE, PRN_STAMP_FOOTERMODE, PRN_STAMP_BODYMODE) of the print character string in the stamp print settings stored in the RAM 203, and determines whether to print the default character string or an optional character string.

If the default character string is printed, the stamp print module 305 acquires the domain name of the client terminal 101, the computer name, the IP address, the MAC address, the print execution time, and the print execution user name, and creates a character string in a format illustrated in FIG. 30. Conversely, if an optional character string is printed, the stamp print module 305 determines the print character string (PRN_STAMP_HEADVALUE, PRN_STAMP_FOOTERVALUE, PRN_STAMP_BODYVALUE) as the stamp character string to be printed. Note that FIG. 30 is an example of the default stamp character string determined in step S4101 in FIG. 29.

Next, the stamp print module 305 executes the stamp character string font creation process (step S4102). More specifically, the creation is based on the font of stamp print setting (PRN_STAMP_HEADFONT, PRN_STAMP_FOOTERFONT, PRN_STAMP_BODYFONT), the size of stamp character string (PRN_STAMP_HEADSIZE, PRN_STAMP_FOOTERSIZE, PRN_STAP_BODYSIZE), the style of stamp character string (PRN_STAMP_HEADSTYLE, PRN_STAMP_FOOTERSTYLE, PRN_STAMP_BODYSTYLE), and the color of stamp character string (PRN_STAMP_HEADCOLOR, PRN_STAMP_FOOTERCOLOR, PRN_STAMP_BODYCOLOR) of the stamp print settings stored in the RAM 203 of the client terminal 101.

Further, when the stamp character string is printed on the entire body text, the stamp print module 305 applies the angle specified in the character angle (PRN_STAMP_BODYANGLE) to the stamp character string. The above described process has now completed the stamp character string font creation process.

Next, the stamp print module 305 of the client terminal 101 determines the position of the stamp character string to be printed on the printed matter (step S4103). More specifically, when the stamp character string is printed in the header and the footer, the stamp print position is determined based on the margin size (PRN_STAMP_HEADSPACESIZE, PRN_STAMP_FOOTERSPACESIZE) of the stamp print settings stored in the RAM 203 of the client terminal 101. Further, when the stamp character string is printed on the entire body text, the stamp print position is determined based on the density setting (PRN_STAMP_BODYDENSITY) of the stamp character string stored in the RAM 203 of the client terminal 101. The above described process has now determined the print position of the stamp character string.

Next, the stamp print module 305 prints the stamp character string using the OutputText function and the like on the device context executing the printing (step S4104). The above described process has now completed the stamp character string print process.

Next, in the same manner as in step S4001, the stamp print module 305 executes the stamp character string print processes in the footer and the entire body text of the printed matter and completes the stamp print execution process (steps S4002 and S4003). The above procedure has now completed the stamp character string writing process. As a result, the stamp print is executed on the printed matter by watermark printing and the stamp character string is printed on the printed matter.

Next, the print control module 304 of the client terminal 101 executes the StartPage function (step S1410).

Next, when the arbitrary program executing the printing executes the EndPage function, the print control module 304 detects (hook process) that the EndPage function is executed (step S1411).

Then, the print control module 304 executes the stamp print determination process in FIG. 27 and determines whether or not to execute the overprinting. If the overprinting is not executed, the process proceeds to step S1414. Conversely, if the overprinting is executed, the print control module 304 executes the stamp character string writing process illustrated in FIG. 28 (step S1413). As a result, the stamp print is executed by overprinting and the stamp character string is printed on the printed matter.

Next, the print control module 304 executes the EndPage function (step S1414). As a result, one page of print process has completed on the printed matter. Note that the processes from step S1406 to step S1414 are repeated for the number of pages of the printed matter.

Next, the arbitrary program executing the printing executes the EndDoc function, the print control module 304 detects (hook process) that the EndDoc function is executed. Then, the print control module 304 executes the EndDoc function and completes the print process. As a result, the printed matter is output from the printer 309.

Next, the print control module 304 determines whether the operation log acquisition setting of the monitor policy matched in the determination process in step S1402 or S1404 is valid or not (step S1418). More specifically, a determination is made as to whether the second column of the monitor policy matched in the determination process in step S1402 or S1404 is 1 (acquire log).

If the operation log acquisition setting is invalid, the filter process is terminated. Conversely, if the operation log acquisition setting is valid, the print control module 304 sends the operation log to the management WEB application 503 of the management server 103 (step S1419) and terminates the filter process. The above procedure has now completed the filter process.

Here, the operation log will be described. The operation log according to the present embodiment includes the agent ID, the operation log occurrence time, the computer name, the domain name, the IP address, the MAC address, the event ID, the detailed event ID, the device ID, the execution process name, the print page count, the print execution time, the print execution printer, the print execution printer port, the print file name, the print type, the stamp character string (header), the stamp character string (footer), and the stamp character string (body text).

The agent ID is an identifier for identifying the agent. The operation log occurrence time is the time when the operation log occurred. The computer name is the computer name of the client terminal. The domain name is the domain name of the client terminal. The IP address is the IP address of the client terminal. The MAC address is the MAC address of the client terminal. The event ID is an event ID for identifying the type of the operation log. The detailed event ID is an ID for identifying the detailed type of the operation log. The device ID is an identifier for identifying the type of a device executing the operation. The execution process name is the name of a process executing the operation. The print page count is the number of print pages. The print execution time is the time when the print is executed. The print execution printer is the name of a printer executing the print. The print execution printer port is the name of a port executing the print. The print file name is a printed file name. The print type is a print setting of the printer. The stamp character string (header) is a character string printed in the header. The stamp character string (footer) is a character string printed in the footer. The stamp character string (body text) is a character string printed in the entire body text. Note that the stamp character string (header), the stamp character string (footer), and the stamp character string (body text) are information added only when the stamp print is executed.

The filter process allows print prohibition and stamp print execution based on the monitor policy created in the monitor policy creation process (steps S610 and S631).

Further, the filter process continues until the agent program 306 is terminated by a client terminal user or a manager through screen operation (step S607).

Next, the operation log receiving and storing process in step S620 will be described. First, when the operation log is sent by the operation log sending process in step S1419 in FIG. 13, the log receiving program 501 of the management server 103 receives the operation log.

Then, the log receiving program 501 stores the received operation log in the operation log table (FIG. 14) of the database 504 (step S620). The operation log table contains the received operation log and the operation log ID for identifying the operation log. FIG. 14 is a drawing schematically illustrating an example of the database table containing information handled in step S620 in FIG. 6.

The above described process has now completed operation log receiving and storing process. Then, the manager can use the WEB browser application 401 of the manager terminal 102 to view the operation log.

Finally, the operation log viewing process in step S613 and S632 will be described. First, the manager activates the WEB browser application 401 of the manager terminal 102 through screen operation to access the management WEB application 503 of the management server 103. Then, a search screen (not shown) is displayed.

Next, when the manager inputs a search condition on the search screen and presses a search button, the search condition is sent to the management WEB application 503 of the management server 103 (step S632).

Next, when the search condition is received, the management WEB application 503 of the management server 103 searches the operation log table (FIG. 14) for the corresponding operation log and returns the operation log to the WEB browser application 401 of the manager terminal 102 (step S613). Then, the WEB browser application 401 displays the result. The above described process has now completed the operation log viewing process.

The above described process has now completed the process procedure of the print control function according to the present embodiment. The print control function allows the print execution prohibition and the stamp print execution from the client terminal 101.

Figure 15B:
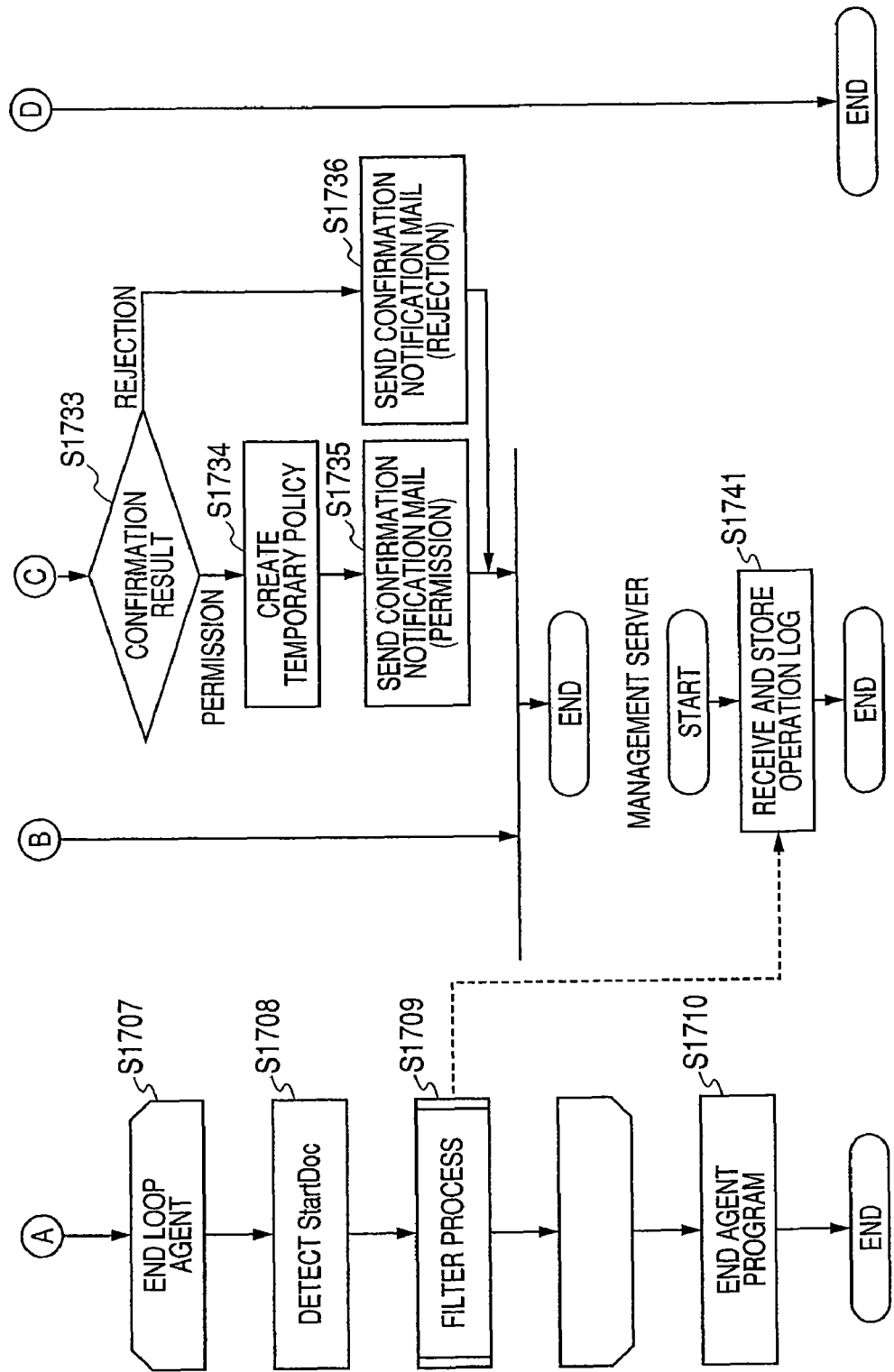
FIG. 15 is comprised of FIGS. 15A and 15B showing flowcharts illustrating an example of a temporary permission function of stamp print according to an embodiment of the present invention.

FIGS. 15A and 15B are flowcharts illustrating a process procedure of a temporary permission function of the print control according to the present embodiment. When a print restriction (printing is prohibited, a stamp character string is forcibly printed on the printed matter, and the like) is imposed by the print control function as shown in FIG. 6, the temporary permission function of the print control allows the print restriction to be temporarily cancelled.

In the beginning, the hardware performing process in an individual step in FIGS. 15A and 15B will be described. First, the processes in steps S1701 and S1702 illustrated in FIGS. 15A and 15B are implemented when the CPU 201 of the client terminal 101 loads and executes the temporary permission application program 302 stored in the storage unit such as the external memory 211.

Next, the processes in steps S1703 and S1710 illustrated in FIGS. 15A and 15B are implemented when the CPU 201 of the client terminal 101 loads and executes the setting program 301 stored in the storage unit such as the external memory 211.

Further, the processes in steps S1704 to S1706 illustrated in FIGS. 15A and 15B are implemented when the CPU 201 of the client terminal 101 loads and executes the control communication service program 303 stored in the storage unit such as the external memory 211.

Further, the processes in steps S1707 to S1709 illustrated in FIGS. 15A and 15B are implemented when the CPU 201 of the client terminal 101 loads and executes the print control module 304 stored in the storage unit such as the external memory 211.

Next, the processes in steps S1721 to S1736 illustrated in FIGS. 15A and 15B are implemented when the CPU 201 of the management server 103 loads and executes the management WEB application 503 stored in the storage unit such as the external memory 211.

Further, the process in step S1741 illustrated in FIGS. 15A and 15B is implemented when the CPU 201 of the management server 103 loads and executes the log receiving program 501 stored in the storage unit such as the external memory 211.

Finally, the processes in steps S1751 to S1752 illustrated in FIGS. 15A and 15B are implemented when the CPU 201 of the manager terminal 102 loads and executes the WEB browser application 401 stored in the storage unit such as the external memory 211. The above described hardware executes the individual steps illustrated in FIGS. 15A and 15B.

Next, the individual steps of the flowchart illustrated in FIGS. 15A and 15B will be described. First, the temporary permission application process in steps S1701 and S1702 will be described. In an environment where a print restriction (printing is prohibited, a stamp character string is forcibly printed on the printed matter, and the like) is imposed by the print control function as shown in FIG. 6, when the print restriction is temporarily cancelled, the temporary permission application process is executed.

Figure 16:
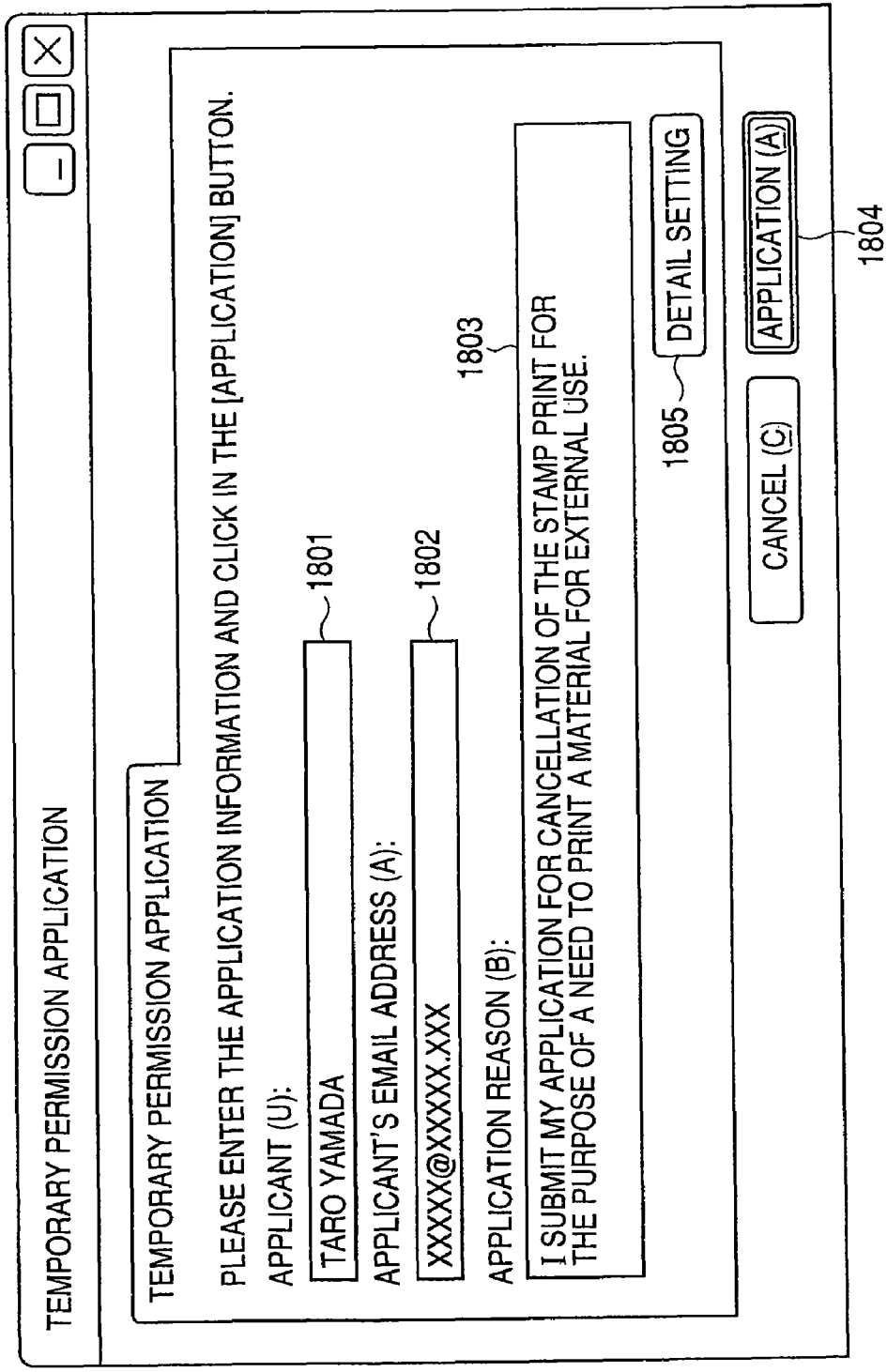
FIG. 16 is a drawing illustrating an example of a screen displayed in step S1701 in FIGS. 15A and 15B.

First, in response to the user's screen operation, the CPU 201 of the client terminal 101 activates the temporary permission application program 302. Then, the temporary permission application program 302 displays the temporary permission application screen (FIG. 16) (step S1701). FIG. 16 is a drawing illustrating an example of a screen displayed in step S1701 in FIGS. 15A and 15B.

The temporary permission application screen allows an entry of the name of an applicant 1801 who wants to execute the temporary permission application, the email address 1802 and the temporary permission application reason 1803.

Figure 33:
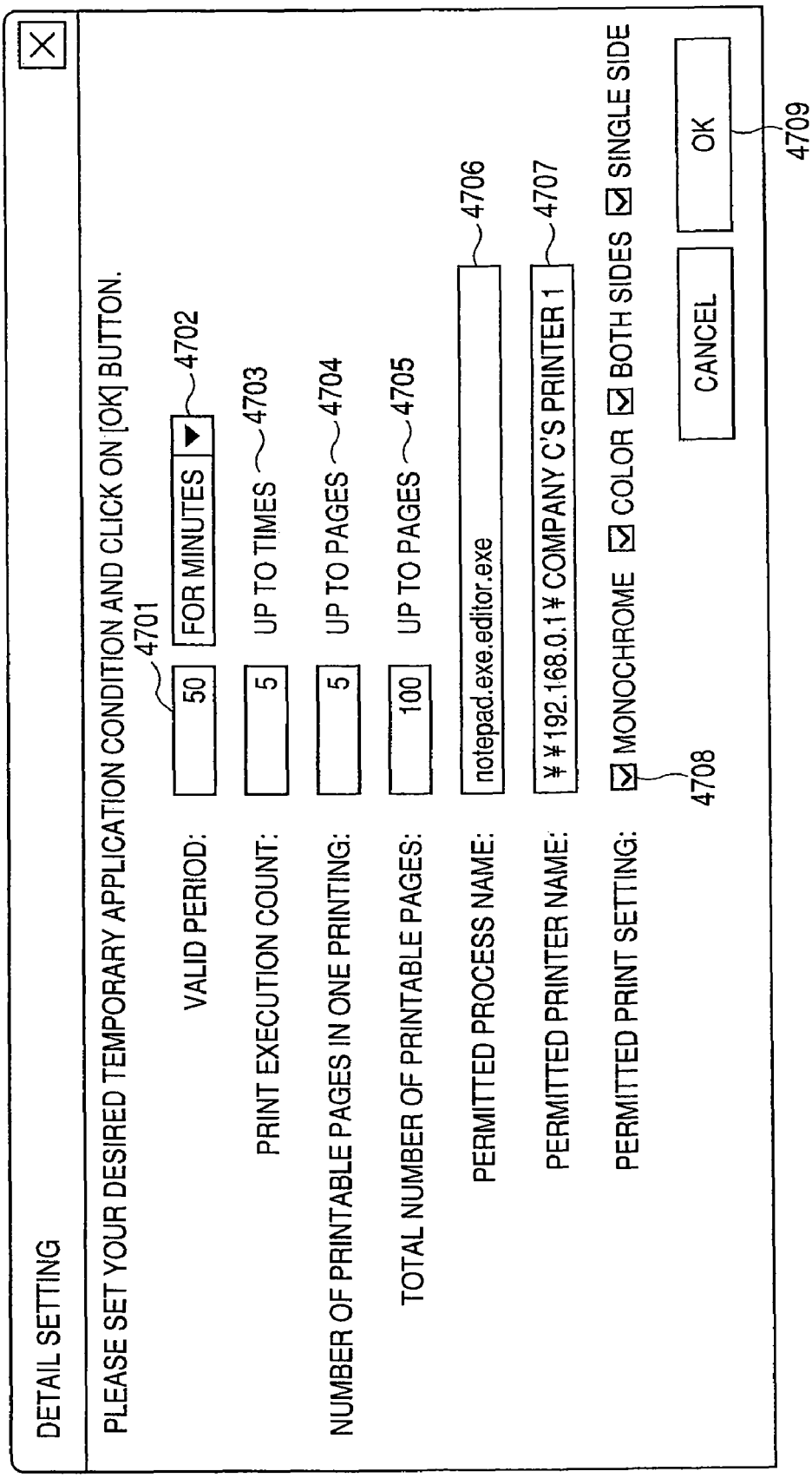
FIG. 33 is a drawing illustrating an example of a screen displayed in step S1701 in FIGS. 15A and 15B.

Further, when the user presses the detail setting 1805 on the temporary permission application screen through screen operation, the temporary permission application program 302 of the client terminal 101 displays the detail setting screen (FIG. 33). FIG. 33 is a drawing illustrating an example of a detail setting screen displayed in step S1701 in FIGS. 15A and 15B. The detail setting screen allows an entry of user's desired conditions for temporary permission application (FIG. 33) such as the temporary permission valid period 4701 and 4702, and the number of permitted prints (print execution count) 4703. The values entered here are sent to the management server 103 in the application information sending process (step S1702) described later, and are used as default values of the individual items (2205 to 2210) on the confirmation screen (FIG. 19) displayed in step S1752. It should be noted that the process in step S1702 is an example of a process of a sending unit of the information processing apparatus according to the present invention and a first sending unit of the information processing system according to the present invention. Further, the above application information is an application example of the request information according to the present invention.

Here, the settings which can be entered on the detail setting screen (FIG. 33) will be described. The valid periods 4701 and 4702 allow an entry of a setting of a temporary permission application valid period. The print execution count 4703 allows an entry of a setting of the number of prints that a temporary permission application can execute. The number of printable pages in one printing 4704 allows an entry of a setting of the number of pages which can printed in one printing. The total number of printable pages 4705 allows an entry of a setting of the total number of pages which can be printed by one temporary permission application. The permitted process name 4706 allows an entry of a specification of a printable application process name. The permitted printer name 4707 allows an entry of a specification of a printable printer name. The permitted print setting 4708 allows an entry of a specification of print conditions (monochrome printing, color printing, both-sided printing, and single-sided printing).

When the user presses "OK" button 4709 on the detail setting screen (FIG. 33) through screen operation, the temporary permission application program 302 of the client terminal 101 displays the temporary permission application screen (FIG. 16) again.

Next, when the user enters application information on the temporary permission application screen (FIG. 16) and presses the "Application" button 1804, the temporary permission application program 302 of the client terminal 101 sends the application information to the management WEB application 503 of the management server 103 via the control communication service program 303 (step S1702).

Here, the application information refers to an agent ID for identifying the agent program 306, an inquiry type ID for identifying the inquiry content to the management server 103, the domain name of the client terminal 101, the computer name, the name of the user logging in the client terminal 101, the applicant name 1801, the applicant's email address 1802, the temporary permission application reason 1803 which are entered on the temporary permission application screen, the temporary policy valid period, the print execution count, the number of printable pages in one printing, the total number of printable pages, the permitted process name, the permitted printer name, and the permitted print setting which are entered on the detail setting screen (FIG. 33). It should be noted that the temporary policy is an application example of a second policy according to the present invention.

Next, the management WEB application 503 of the management server 103 receives application information and stores the application information in the temporary permission application table (FIG. 17) of the database 504. FIG. 17 is a drawing schematically illustrating an example of the database table containing information handled in step S1721 in FIGS. 15A and 15B. Note that the process in step S1721 where the management server 103 receives the application information is an example of a first receiving unit of the information processing system according to the present invention.

The temporary permission application table contains information sent from the client terminal 101 including the application information, the temporary permission application ID for identifying the temporary permission application, the time when the temporary permission application was submitted, the time when the manager confirmed the temporary permission application, the confirmation reason, and the application state information about the state of the temporary permission application (application permission, application rejection, not confirmed).

Here, the individual values stored in the detail setting of the temporary permission application table (FIG. 17) will be described. Expriedt contains the date when the temporary policy becomes invalid. Note that if the date when the temporary policy becomes invalid is not specified, 0 is stored. PrintCount contains the number of times printing can be executed. Note that if the number of times printing is executed is not specified, −1 is stored. The PageCount contains the number of pages which can be printed in one printing. Note that if the number of pages which can be printed in one printing is not specified, −1 is stored. TotalCount contains the number of pages which can be printed in one temporary permission application. Note that if the number of pages which can be printed in one temporary permission application is not specified, −1 is stored. AllowProc contains the name of the process whose printing is permitted. AllowPrinter contains the name of a printer whose printing is permitted. PrintSetting contains the setting of the printer whose printing is permitted. For example, when the setting of the printer whose printing is permitted is not specified, 0x0000000 is stored. When monochrome printing is permitted, 0x0000001 is stored. When color printing is permitted, 0x0000002 is stored. When single-sided printing is permitted, 0x0000004 is stored. When both-sided printing is permitted, 0x0000008 is stored.

The above values are used as the default values for the individual items (2205 to 2210) on the confirmation screen (FIG. 19) displayed in step 1752 described later. The above described procedure has now completed the temporary permission application process. As a result, when the user wants to cancel the print restriction, the user need not directly request the manager for cancellation by phone or orally.

Next, the temporary permission application confirmation process in steps S1731 to S1736 and steps S1751 and S1752 will be described.

The temporary permission application confirmation process is a process in which the manager confirms the temporary permission application and creates a temporary policy file for temporarily cancelling the print restriction.

First, the management WEB application 503 of the management server 103 sends an application notification mail shown in FIG. 18 to the manager (step S1731). The application notification mail has the application information sent from the client terminal 101. FIG. 18 is a drawing showing an example of email sent in step S1931 in FIGS. 15A and 15B.

Next, in response to manager's screen operation, the CPU 201 of the manager terminal 102 activates the email receiving application 402 and receives the application notification mail (step S1751). Then, the manager recognizes that a temporary permission application has been submitted.

Next, in response to manager's screen operation, the CPU 201 of the manager terminal 102 activates the WEB browser application 401. Then, the WEB browser application 401 accesses the management WEB application 503 of the management server 103 and displays the confirmation screen (FIG. 19). FIG. 19 is a drawing illustrating an example of a screen displayed in step S1752 in FIGS. 15A and 15B.

The confirmation screen (FIG. 19) displays the items for setting the application content 2201 entered in step S1701, the temporary permission application confirmation setting 2202, the confirmer name 2203 performing confirmation, the conditions 2204 to 2210 for permitting the temporary permission application, the setting 2211 as to whether or not to send confirmation notification mail after condition confirmation in the case of permission, the destination email address 2212, and the temporary permission application confirmation reason 2215.

Here, the conditions for permitting the temporary permission application which can be entered on the confirmation screen will be described. The valid period 2204 allows an entry of a setting of a valid period for the temporary permission application. The print execution count 2205 allows an entry of a setting of the number of prints which can be executed by the temporary permission application. The number of printable pages in one printing 2206 allows an entry of a setting of the number of pages which can be printed in one printing. The total number of printable pages 2207 allows an entry of a setting of the total number of pages which can be printed in one temporary permission application. The permitted process name 2208 allows an entry of a specification of a printable application process name. The permitted printer name 2209 allows an entry of a specification of a printable printer name. The permitted print setting 2210 allows an entry of a specification of print conditions (color printing, monochrome printing, both-sided printing, and single-sided printing).

The manager enters the above information through screen operation and presses "execute confirmation process with above settings" button 2214 on the confirmation screen (FIG. 19). Then, the WEB browser application 401 of the manager terminal 102 sends the temporary permission application confirmation result information to the management WEB application 503 of the management server 103 (step S1752).

The confirmation result information of the temporary permission application includes the temporary permission application result (permission confirmation, and rejection confirmation), the valid period, the print execution count, the number of printable pages in one printing, the total number of printable pages, the permitted process name, the permitted printer name, the permitted print setting, whether or not to send the confirmation notification mail, the confirmation notification mail destination, and the confirmation reason.

Next, the management WEB application 503 of the management server 103 receives the confirmation result information of the temporary permission application.

Then, the management WEB application 503 updates the application state, the confirmation time, the confirmation notification address, and the confirmation reason in the temporary permission application table (FIG. 17) based on the temporary permission application confirmation result information sent from the manager terminal 102.

Next, the management WEB application 503 of the management server 103 uses the temporary permission application result of the temporary permission application confirmation result information sent from the manager terminal 102 to determine whether the temporary permission application is permitted or not (step S1733).

In the case of rejection confirmation, the management WEB application 503 sends a confirmation notification mail (FIG. 26) notifying that the temporary permission application is rejected, to the confirmation notification mail address entered on the confirmation screen (FIG. 19) and completes the process. FIG. 26 is a drawing illustrating an example of email sent in step S1736 in FIGS. 15A and 15B.

The confirmation notification mail (FIG. 26) notifying that the temporary permission application is rejected contains the content of the temporary permission application and the reason why the manager made a rejection confirmation.

Conversely, in the case of permission confirmation, the management WEB application 503 stores the temporary permission application confirmation result information in the temporary policy table (FIG. 20) of the database 504. FIG. 20 is a drawing schematically illustrating an example of the database table containing information handled in step S1732 in FIGS. 15A and 15B.

The temporary policy table contains the agent ID for identifying the agent program 306, the time when the temporary policy was stored, the valid period when the temporary policy is valid, the name of a user executing the temporary permission application, the computer name, the domain name, and the condition for submitting the temporary permission application entered on the confirmation screen (FIG. 19).

Here, the properties used by the temporary policy 2401 in the temporary policy table illustrated in FIG. 20 will be described. Expriedt contains the date when the temporary policy becomes invalid. Note that if the date when the temporary policy becomes invalid is not specified, 0 is stored. PrintCount contains the number of times the print can be executed. Note that if the number of times the print can be executed is not specified, −1 is stored. PageCount contains the number of pages which can be printed in one printing. Note that if the number of pages which can be printed in one printing is not specified, −1 is stored. TotalCount contains the number of pages which can be printed in one temporary permission application. Note that if the number of pages which can be printed in one temporary permission application is not specified, −1 is stored. AllowProc contains the name of a process whose printing is permitted. AllowPrinter contains the name of a printer whose printing is permitted. PrintSetting contains the setting of the printer whose printing is permitted. For example, when the setting of the printer whose printing is permitted is not specified, 0x0000000 is stored. When monochrome printing is permitted, 0x0000001 is stored. When color printing is permitted, 0x0000002 is stored. When single-sided printing is permitted, 0x0000004 is stored. When both-sided printing is permitted, 0x0000008 is stored.

Further, the management WEB application 503 of the management server 103 sends the confirmation notification mail (FIG. 21) to the confirmation notification mail address entered on the confirmation screen (FIG. 19). FIG. 21 is a drawing illustrating an example of email sent in step S1735 in FIGS. 15A and 15B.

The confirmation notification mail (FIG. 21) contains the content of the temporary permission application, the permission confirmation reason and the content of the temporary permission application conditions. The above described procedure has now completed the temporary permission application confirmation process.

As a result, the temporary permission application is confirmed. When permission is confirmed, the temporary policy is created.

Next, the temporary permission application inquiry process in steps S1703 and S1704, and steps S1722 and S1723 will be described. The temporary permission application inquiry process is a process of confirming the confirmation state of the temporary permission application sent in step S1702.

First, the user activates the setting program 301 (not shown) of the client terminal 101 through screen operation and executes the temporary permission application inquiry instruction.

When the temporary permission application inquiry instruction is executed, the setting program 301 acquires the application state inquiry information and send the information to the management WEB application 503 of the management server 103 via the control communication service program 303 (step S1703).

Here, the application state inquiry information includes an agent ID for identifying the agent program 306, an inquiry type ID for identifying the inquiry content to the management server 103, the domain name of the client terminal 101, the user name, and the name of a user logging in the client terminal 101.

Next, the management WEB application 503 of the management server 103 receives the application state inquiry information and searches the temporary permission application table (FIG. 17) for a temporary permission application during application based on the agent ID, the domain name, the computer name and the user name.

If there is a temporary permission application, the management WEB application 503 determines whether the temporary permission application is permitted, rejected, or not confirmed (step S1722). More specifically, if the value of the application state column in the temporary permission application table is 0, the temporary permission application is determined to be not confirmed; if the value is 1, the temporary permission application is determined to be permitted; and if the value is 2, the temporary permission application is determined to be rejected.

Next, the management WEB application 503 of the management server 103 sends the temporary permission application state to the control communication service program 303 of the client terminal 101 (step S1723).

Next, the control communication service program 303 of the client terminal 101 receives the temporary permission application state and notifies the setting program 301.

If the temporary permission application state is confirmed to be permitted, the setting program 301 displays a message (not shown) indicating that the temporary permission application is permitted, and the process proceeds to temporary policy acquisition process (step S1705).

Conversely, if the temporary permission application state is confirmed to be rejected, the setting program 301 displays a message (not shown) indicating that the temporary permission application is rejected.

Further, if the temporary permission application state is not confirmed, the setting program 301 displays a message (not shown) indicating that the temporary permission application has not been confirmed, and terminates the program. The above described procedure has now completed the temporary permission application inquiry process.

Then, the user can confirm the sent temporary permission application state in real time.

Next, the temporary policy acquisition process in steps S1705, S1706 and S1724 will be described. The temporary policy acquisition process acquires the temporary policy for temporarily cancelling the print restriction from the management server 103 and performs the reflecting process on the agent program 306. It should be noted that the temporary policy sending process of the management server 103 in step S1724 is an example of a second sending unit of the information processing system according to the present invention.

First, the control communication service program 303 of the client terminal 101 sends the temporary policy request information to the management WEB application 503 of the management server 103 (step S1705).

Here, the temporary policy request information contains the agent ID for identifying the agent program 306, the inquiry type ID for identifying the inquiry for the management server 103, the domain name of the client terminal 101, the user name, and the name of a user logging in the client terminal 101.

Next, the management WEB application 503 of the management server 103 acquires the temporary policy 2401 created in step S1734 from the temporary policy table (FIG. 20) based on the agent ID of the temporary policy request information, the domain name, the computer name, and the user name. Note that the process in step S1734 is an example of the creation unit of the information processing system according to the present invention.

Then, the management WEB application 503 adds the agent ID, the computer name, the user name, and the domain name to the temporary policy, and sends the temporary policy to the control communication service program 303 of the client terminal 101 (step S1735).

Next, the control communication service program 303 of the client terminal 101 receives the information and creates a temporary policy file (FIG. 22) in the storage unit such as the external memory 211. FIG. 22 is a drawing schematically illustrating an example of the temporary policy file saved in step S1706 in FIGS. 15A and 15B. The temporary policy receiving process of the client terminal 101 is an example of the first receiving unit of the information processing apparatus or the like of the present invention and the second receiving unit of the information processing system of the present invention.

Further, when the temporary policy file is created, the control communication service program 303 of the client terminal 101 reads the temporary policy file and stores the settings in the RAM 203 (step S1705). The above described temporary policy acquisition process has now been completed.

As a result, the temporary policy is applied to the client terminal 101, and the print restriction imposed by the print control function illustrated in FIG. 6 is temporarily cancelled.

Next, the filter process in steps from S1707 to S1709 will be described. First, an arbitrary program stored in the external memory 211 of the client terminal 101 executes printing (StartDoc function). Then, the print control module 304 of the client terminal 101 detects (hooks) the printing (StartDoc) (step S1708).

Figure 23:
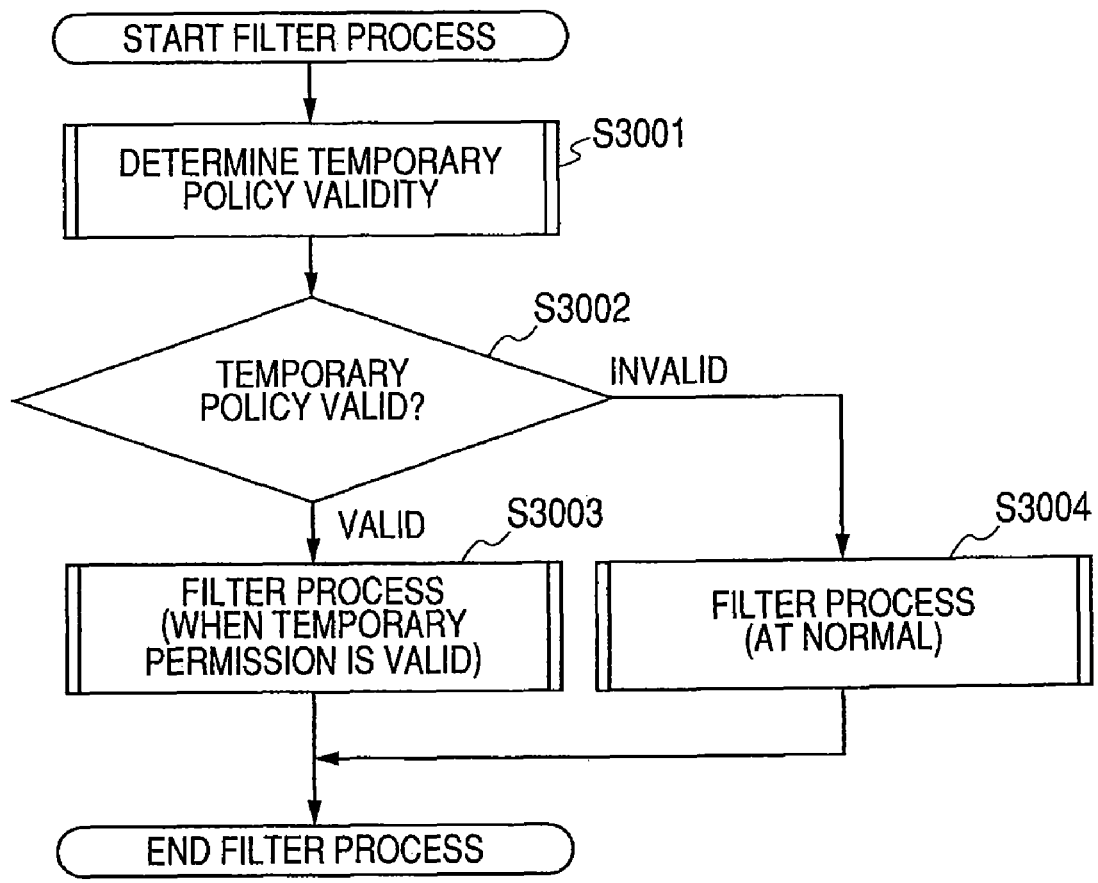
FIG. 23 is a flowchart of a filter process executed in step S1708 in FIGS. 15A and 15B.

Next, the print control module 304 of the client terminal 101 executes the filter process illustrated in FIG. 23, and executes the print control based on the monitor policy (step S1709). FIG. 23 is a flowchart of the filter process executed in step S1708 in FIGS. 15A and 15B. It should be noted that the process in step S1709 is an example of a process of the print control unit according to the present invention.

Hereinafter, the filter process will be described with reference to the flowchart in FIG. 23. Note that the filter process illustrated in FIG. 23 is implemented when the CPU 201 of the client terminal 101 loads and executes the print control module 304 stored in the storage unit such as the external memory 211.

Figure 24:
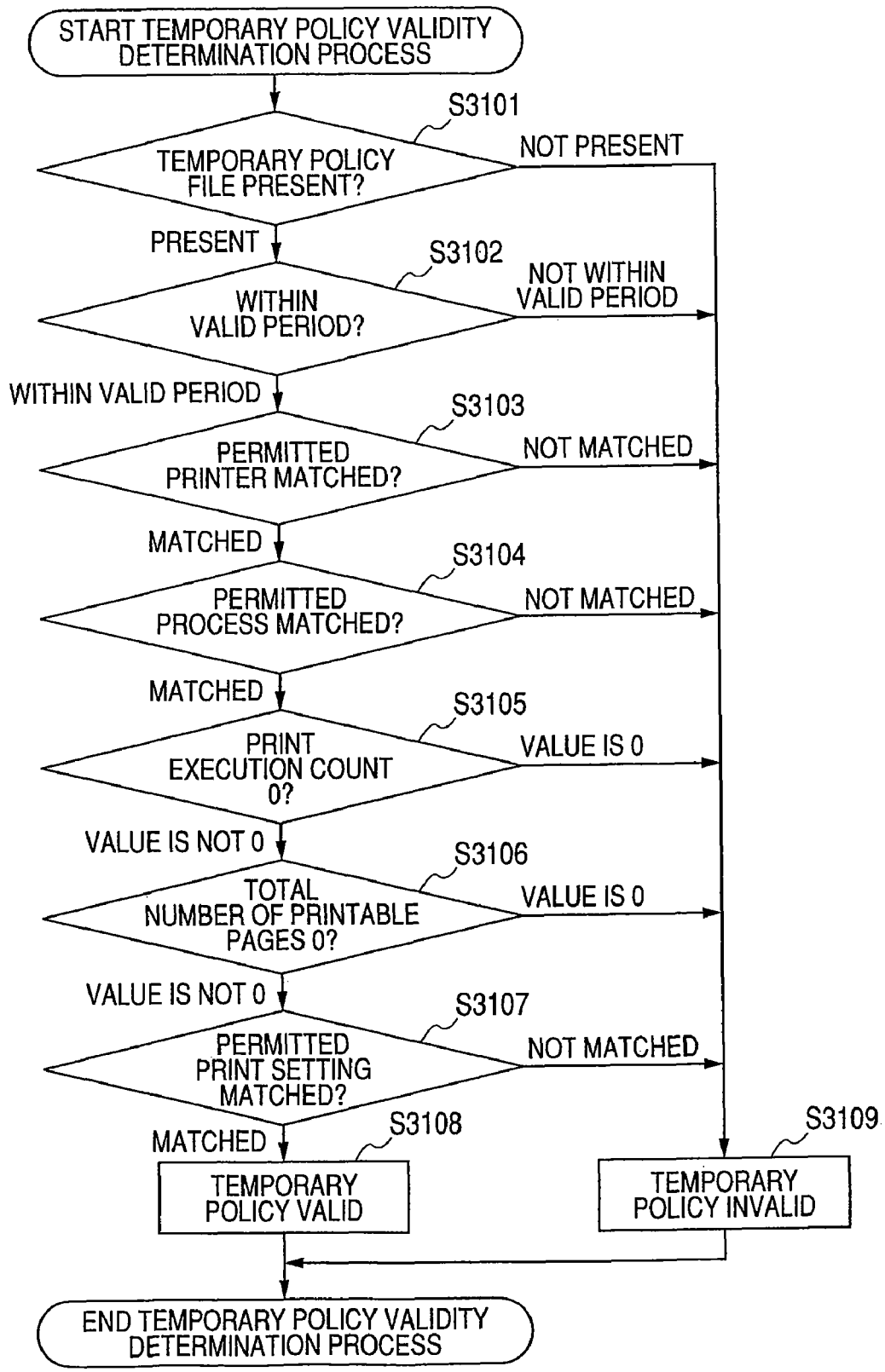
FIG. 24 is a flowchart of a temporary policy validity determination process executed in step S3002 in FIG. 23.

First, the print control module 304 of the client terminal 101 determines whether the temporary policy is in a valid state or not. More specifically, the process illustrated in FIG. 24 is executed. FIG. 24 is a flowchart of a temporary policy validity determination process executed in step S3002 in FIG. 23.

Hereinafter, the temporary policy validity determination process will be described in detail with reference to the flowchart in FIG. 24. Note that the temporary policy validity determination process illustrated in FIG. 24 is implemented when the CPU 201 of the client terminal 101 loads and executes the print control module 304 stored in the storage unit such as the external memory 211.

First, the print control module 304 of the client terminal 101 confirms whether or not there is a temporary policy file stored in the RAM 203 (step S3101).

If there is not a temporary policy file, the print control module 304 determines that the temporary policy is invalid, and terminates the process (step S3109). Conversely, if there is a temporary policy file, the print control module 304 refers to the valid period (Expiredt) in the temporary policy file and determines whether or not the current time of the day exceeds the valid period (step S3102).

If the current time of the day exceeds the valid period, the print control module 304 determines that the temporary policy is invalid, and terminates the process (step S3109). Conversely, if the current time of the day does not exceed the valid period, the print control module 304 refers to the permitted printer (AllowPrint) in the temporary policy file and determines whether or not the permitted printer name matches the name of a printer executing the print (step S3103).

If the printer names are not matched, the print control module 304 determines that the temporary policy is invalid, and terminates the process (step S3109). Conversely, if the printer names are matched or no permitted printer name is set, the print control module 304 refers to the permitted process (AllowProc) in the temporary policy file and determines whether or not the permitted process name matches the process name of a program executing the print (step S3104).

If the process names are not matched, the print control module 304 of the client terminal 101 determines that the temporary policy is invalid, and terminates the process (step S3109). Conversely, if the process names are matched or no permitted process name is set, the print control module 304 determines whether the value of the print execution count (PageCount) in the temporary policy file is 0 or not (step S3105).

If the value of the print execution count is 0, the print control module 304 of the client terminal 101 determines that the temporary policy is invalid, and terminates the process (step S3109). Conversely, if the value of the print execution count is equal to or greater than 1, the print control module 304 determines whether the value of the total number of printable pages (TotalCount) is 0 or not (step S3106).

If the value of total number of printable pages is 0, the print control module 304 of the client terminal 101 determines that the temporary policy is invalid, and terminates the process (step S3109). Conversely, if the value of total number of printable pages is equal to or greater than 1, the print control module 304 determines whether the value of the permitted print setting (PrintSettting) matches the print setting to be executed (step S3107).

If the value of the permitted print setting does not match the print setting to be executed, the print control module 304 of the client terminal 101 determines that the temporary policy is invalid, and terminates the process (step S3109). Conversely, if the value of the permitted print setting matches the print setting to be executed, the print control module 304 determines that the temporary policy is valid, and terminates the process (step S3108). The above described process determines whether or not the temporary policy is valid.

Next, in step S3001, if a determination is made that the temporary policy is invalid, the print control module 304 of the client terminal 101 executes the above described normal filter process (FIG. 13).

Figure 25:
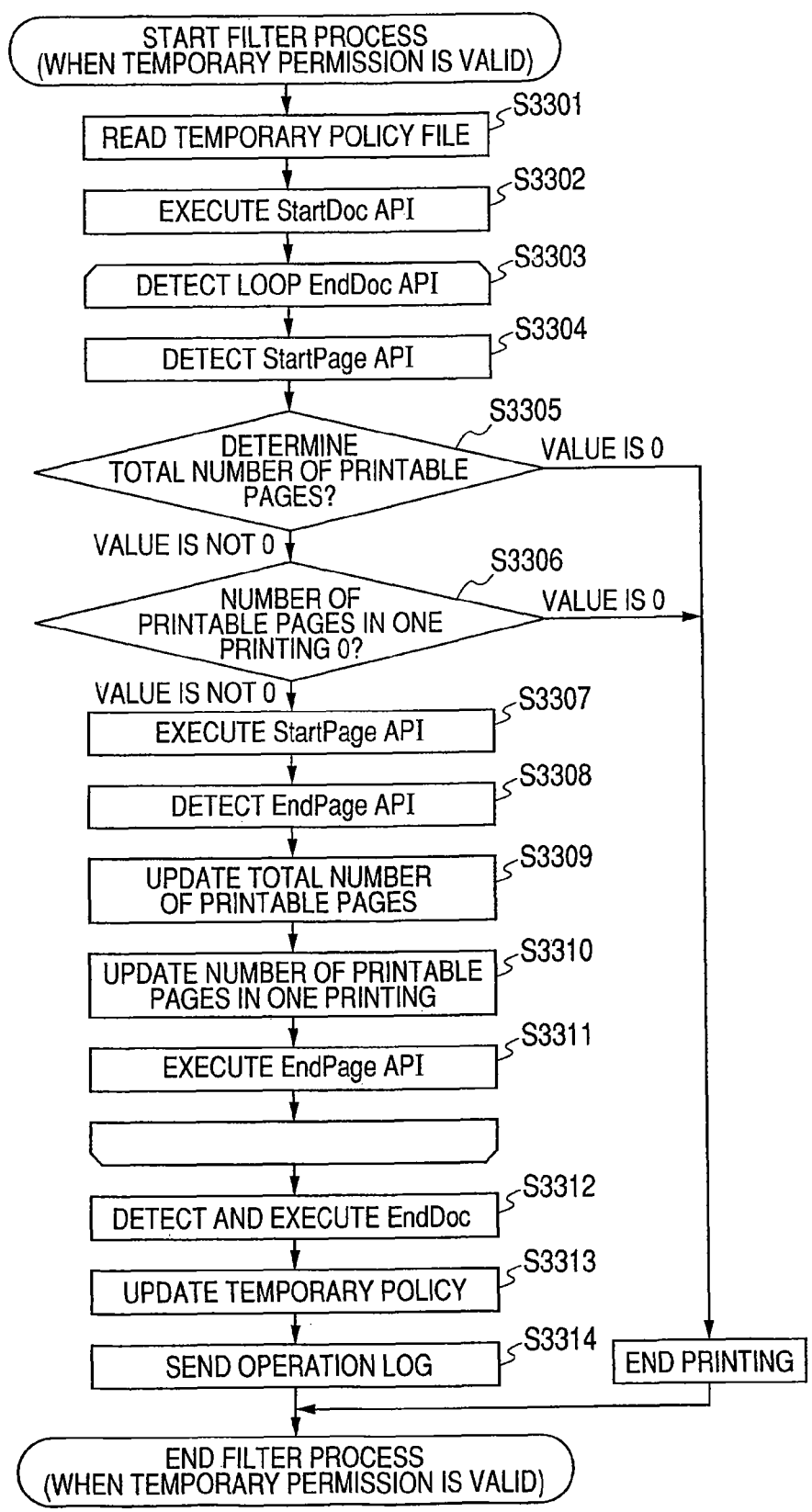
FIG. 25 is a flowchart of a filter process when the temporary permission is valid.

Conversely, in step S3001, if a determination is made that the temporary policy is valid, the print control module 304 of the client terminal 101 executes the filter process when the temporary permission is valid. More specifically, the print control module 304 executes the process illustrated in FIG. 25. FIG. 25 is a flowchart of the filter process when the temporary permission is valid.

Hereinafter, the filter process when the temporary permission is valid will be described with reference to the flowchart in FIG. 25. Note that the filter process (when the temporary permission is valid) illustrated in FIG. 25 is implemented when the CPU 201 of the client terminal 101 loads and executes the print control module 304 stored in the storage unit such as the external memory 211.

First, the print control module 304 of the client terminal 101 refers to the temporary policy file stored in the external memory 211 of the client terminal 101 and stores the temporary policy file in the RAM 203 of the client terminal 101 (step S3301).

Next, the print control module 304 of the client terminal 101 executes the StartDoc function hooked in step S1708 in FIGS. 15A and 15B and starts printing (step S3302).

Next, when the arbitrary program executing the printing executes the StartPage function, the print control module 304 of the client terminal 101 detects (hooks) that the StartPage function is executed (step S3304).

Then, the print control module 304 determines whether the value (TotalCount) of the total number of printable pages in the temporary policy file stored in the RAM 203 of the client terminal 101 is 0 or not (step S3305)

If the value of the total number of printable pages is 0, the print control module 304 returns an error value to the arbitrary program executing the printing (step S3315). The process terminates the print process. Conversely, if the value of the total number of printable pages is equal to or greater than 1, the print control module 304 determines whether the value (PageCount) of the number of printable pages in one printing in the temporary policy file stored in the RAM 203 is 0 or not (step S3306).

If the value of the number of printable pages in one printing in the temporary policy file is 0, the print control module 304 returns an error value to the arbitrary program executing the printing (step S3315). The process terminates the print process.

Conversely, if the number of printable pages in one printing is equal to or greater than 1, the print control module 304 executes the StarPage function. The process starts printing one page (step S3307).

Next, when the arbitrary program executing the print executes the EndPage function, the print control module 304 of the client terminal 101 detects (hooks) the EndPage function (step S3308).

Then, the print control module 304 updates the value of the total number of printable pages. More specifically, the value (TotalCount) of the total number of printable pages stored in the RAM 203 of the client terminal 101 is decremented by one (step S3309).

Next, the print control module 304 updates the value of the number of printable pages in one printing stored in the RAM 203 of the client terminal 101. More specifically, the value of the number of printable pages in one printing stored in the RAM 203 of the client terminal 101 is decremented by one (step S3310).

Then, the print control module 304 executes the EndPage function. The process completes printing one page (step 3311). The above processes in steps from S3303 to S3311 are executed until the EndDoc function is detected.

Next, when the arbitrary program executing the print executes the EndDoc function, the print control module 304 detects (hooks) the EndDoc function and executes the End-Doc function (step 3312). The process completes the print, and the printed matter is output from the printer 309.

Next, the print control module 304 updates the values of the print execution count (PrintCount), the number (PageCount) of printable pages in one printing, and the total number (Total-Count) of printable pages in the temporary policy file stored in the external memory 211 of the client terminal 101.

Next, the print control module 304 of the client terminal 101 sends the operation log to the management server 103 (step S3314).

The value of the print type in the operation log contains a value (0x80000000) for identifying that the print is executed by the temporary permission function. This can identify that the temporary permission function is in a valid state, and the print is executed. The above described process has now completed the filter process when the temporary permission is valid.

The filter process executes the filter process until the client terminal user or the manager terminates the agent program 306 through screen operation (step S1710) The above described procedure has now completed the filter process.

Next, the operation log receiving and storing process in step S1741 illustrated in FIGS. 15A and 15B will be described. First, when the operation log is sent by the operation log sending process in step S3314 illustrated in FIG. 25, the log receiving program 501 of the management server 103 receives the operation log.

Then, the log receiving program 501 stores the received operation log in the operation log table (FIG. 14) of the database 504 (step S1741). The operation log table contains the received operation log and the operation log ID for identifying the operation log. The above described process has completed the operation log receiving and storing process. The above described procedure has now completed the process of the temporary permission function of the print control according to the present embodiment.

As described above, the present embodiment can provide an efficient, higher-security print control system in order to specify a print control temporary permission function and an executable application and execute a secondary restriction such as a print execution count.

It should be noted that the above described various types of data configuration and content thereof are not limited to this, but it will be apparent that various configurations and content can be made according to the application and object.

Hereinbefore, the embodiments of the present embodiment have been described. For example, the present invention may encompass an embodiment as a system, an apparatus, a method, a program, a recording medium, or the like. More specifically, the present invention may be applied to a system made of a plurality of devices, or may be applied to an apparatus made of a single device.

The individual steps of the present invention may be implemented by executing software (programs) acquired via a network or various kinds of storage media by a processing device (CPU, or a processor) such as a personal computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2008-143540, filed May 30, 2008, which is hereby incorporated by reference herein in its entirety.

What is claimed is:

1. An information processing apparatus adapted to control a print process based on a first policy indicating a control content of a stamp print process, said apparatus comprising:
   a sending unit configured to send, to a first external apparatus, request information for requesting a temporary cancellation of the stamp print process specified in the first policy;
   a first receiving unit configured to receive, from the first external apparatus, a second policy created by the first external apparatus in response to the request information; and
   a control unit configured to control the print process by temporarily cancelling the stamp print process specified in the first policy, based on the second policy,
   wherein the second policy contains a setting including at least one of a period of permitting the stamp print process to not add stamp information, a number of times of permitting the stamp print process to not add stamp information, and a page permitting the stamp print process to not add stamp information.

2. The information processing apparatus according to claim 1, wherein said control unit controls a stamp print process to not add stamp information by temporarily cancelling a stamp print process of adding stamp information specified in the first policy, based on the second policy.

3. The information processing apparatus according to claim 2, wherein a printer permitting a stamp print process of not adding stamp information is set in the second policy; and when said control unit controls the printer set in the second policy, the control unit controls the stamp print process to not add stamp information.

4. The information processing apparatus according to claim 2, wherein a process permitting a stamp print process of not adding stamp information is set in the second policy; and when a print instruction is made by a process set in the second policy, said control unit controls the stamp print process to not add stamp information.

5. The information processing apparatus according to claim 1, wherein said first receiving unit receives the second policy when a second external apparatus performs a confirmation process for the request information.

6. The information processing apparatus according to claim 1, wherein said control unit does not perform print control based on the second policy when the content of the setting for permitting the stamp print process to not add stamp information, contained in the second policy, is not satisfied.

7. The information processing apparatus according to claim 1, further comprising a second receiving unit configured to receive the first policy from the first external apparatus.

8. The information processing apparatus according to claim 1, wherein said first receiving unit receives the second policy corresponding to user information contained in the request information.

9. An information processing system comprising an information processing apparatus adapted to control a print process based on a first policy indicating a control content of a stamp print process and a management apparatus adapted to create the first policy, the information processing apparatus being connected to the management apparatus via a network, said information processing apparatus comprising:
a first sending unit configured to send, to the management apparatus, request information for requesting a temporary cancellation of the stamp print process specified in the first policy; and said management apparatus comprising:
a first receiving unit configured to receive the request information from said information processing apparatus;
a creation unit configured to create a second policy based on the request information; and
a second sending unit configured to send the second policy to said information processing apparatus,
wherein said information processing apparatus further comprises:
a second receiving unit configured to receive the second policy from said management apparatus; and
a control unit configured to control the print process by temporarily cancelling the stamp print process specified in the first policy, based on the second policy,
wherein the second policy contains a setting including at least one of a period of permitting the stamp print process to not add stamp information, a number of times of permitting the stamp print process to not add stamp information, and a page permitting the stamp print process to not add stamp information.

10. A method of controlling an information processing apparatus adapted to control a print process based on a first policy indicating a control content of a stamp print process, the method comprising:
sending, to a first external apparatus, request information for requesting a temporary cancellation of the stamp print process specified in the first policy;
receiving, from the first external apparatus, a second policy created by the first external apparatus in response to the request information; and
controlling the print process by temporarily cancelling the stamp print process specified in the first policy, based on the second policy,
wherein the second policy contains a setting including at least one of a period of permitting the stamp print process to not add stamp information, a number of times of permitting the stamp print process to not add stamp information, and a page permitting the stamp print process to not add stamp information.

11. A non-transitory computer readable storage medium adapted to store a program for executing the method according to claim 10.

* * * * *